(12) United States Patent
Jeon et al.

(10) Patent No.: US 8,462,150 B2
(45) Date of Patent: Jun. 11, 2013

(54) STEREOSCOPIC IMAGE DISPLAY DEVICE

(75) Inventors: Byoung Kun Jeon, Daejeon (KR); Sin Young Kim, Daejeon (KR); Sergey Belyaev, Daejeon (KR); Moon Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 159 days.

(21) Appl. No.: 13/087,199

(22) Filed: Apr. 14, 2011

(65) Prior Publication Data

US 2011/0254834 A1 Oct. 20, 2011

(30) Foreign Application Priority Data

Apr. 14, 2010 (KR) .................. 10-2010-0034216
Apr. 13, 2011 (KR) .................. 10-2011-0034353

(51) Int. Cl.
*G06T 15/00* (2011.01)
*G06T 19/00* (2011.01)

(52) U.S. Cl.
USPC ............... 345/419; 345/7; 348/42; 348/57; 348/E31.04; 348/E31.059; 349/15; 351/210

(58) Field of Classification Search
USPC ........... 345/419, 7; 348/42, E13.04, E13.059, 348/57; 351/210; 349/15
See application file for complete search history.

(56) References Cited

U.S. PATENT DOCUMENTS

| | | | | |
|---|---|---|---|---|
| 5,198,929 A | * | 3/1993 | Clough | 359/513 |
| 5,860,912 A | * | 1/1999 | Chiba | 600/111 |
| 5,872,590 A | * | 2/1999 | Aritake et al. | 348/57 |
| 5,886,675 A | * | 3/1999 | Aye et al. | 345/7 |
| 5,976,017 A | * | 11/1999 | Omori et al. | 463/32 |

FOREIGN PATENT DOCUMENTS

KR 10-2009-0100800 A 9/2009

* cited by examiner

*Primary Examiner* — Kimbinh T Nguyen
(74) *Attorney, Agent, or Firm* — McKenna Long & Aldridge, LLP

(57) ABSTRACT

The present invention may provide a stereoscopic image display device capable of preventing crosstalk or reduction of viewing angles upon displaying stereoscopic images, and improving image quality such as contrast ratio; an optical filter for the stereoscopic image display device; polarizing glasses for observing stereoscopic images; or a method of improving stereoscopic image quality.

23 Claims, 16 Drawing Sheets

| UR | UL | UR | UL | UR | UL |
|----|----|----|----|----|----|
| UL | UR | UL | UR | UL | UR |
| UR | UL | UR | UL | UR | UL |
| UL | UR | UL | UR | UL | UR |
| UR | UL | UR | UL | UR | UL |
| UL | UR | UL | UR | UL | UR |

| AR | AL | AR | AL | AR | AL |
|----|----|----|----|----|----|
| AL | AR | AL | AR | AL | AR |
| AR | AL | AR | AL | AR | AL |
| AL | AR | AL | AR | AL | AR |
| AR | AL | AR | AL | AR | AL |
| AL | AR | AL | AR | AL | AR |

STEREOSCOPIC IMAGE DISPLAY DEVICE

TECHNICAL FIELD

This application claims the benefit of Korean Application Nos. 10-2010-0034216, filed on Apr. 14, 2010 and 10-2011-0034353, filed on Apr. 13, 2011, which are hereby incorporated by reference for all purposes as if fully set forth herein.

The present invention relates to a stereoscopic image display device, an optical filter for a stereoscopic image display device, glasses that are used for observing stereoscopic images and a method for improving the quality of stereoscopic images.

BACKGROUND ART

A stereoscopic image display device is a display device by which an observer can observe three-dimensionally an object to be displayed.

Stereoscopic image display devices can be divided into glasses type devices and glasses-free type devices. Furthermore, the glasses type can be classified into polarizing glasses type and LC shutter glasses type, while the glasses-free type can be classified into binocular/multi-view binocular disparity type, volume type or holographic type, and the like.

DISCLOSURE

Technical Problem

Objects of the present invention include providing a stereoscopic image display device, an optical filter for a stereoscopic image display device, glasses that are used for observing stereoscopic images and a method for improving the quality of stereoscopic images.

Technical Solution

The present invention relates to a stereoscopic image display device that comprises an image display part which is capable of generating image signals, comprising image light for the right eye and image light for the left eye, and is also capable of then transferring them to the observer's side; and a retardation film that has a phase difference in the thickness direction and is disposed such that the image signals transferred from the image display part may pass through it according to the thickness direction and then be transferred to the observer's side.

The stereoscopic image display device is explained in detail below.

In this specification, terms such as vertical, horizontal, perpendicular or parallel, which are used while defining an angle, means substantially vertical, horizontal, perpendicular or parallel within a range without damaging the desired effect, and may have, for example, an error including production error or deviation, and the like. For example, the terms may each include not more than about ±15 degrees of error, preferably not more than about ±10 degrees of error, and more preferably not more than about ±5 of error.

In this specification, unless defined particularly otherwise, the unit of angle is "degree," the unit of phase difference is "nm" and the unit of crosstalk ratio or brightness is "cd/m²."

If image light for the right eye and image light for the left eye generated in an image display part of a stereoscopic image display device are appropriately passed or blocked in a process of transferring them to an observer, each image light may be accurately viewed by the right eye or left eye of the observer, and therefore, light and shade can be surely distinguished while image quality such as contrast ratio be improved.

However, generally, if the stereoscopic image display device is viewed at an oblique angle, it is difficult to suitably block light leakage of image light for the right eye or left eye, and therefore a so-called crosstalk phenomenon occurs, in which image light for the right eye is viewed by the left eye or image light for the left eye is viewed by the right eye. Also the viewing angle becomes narrow. In order to prevent the crosstalk phenomenon, a light shielding part may be formed in the device; however, forming the light shielding part unavoidably results in a decline in brightness.

In the stereoscopic image display device, a retardation film having a phase difference in the thickness direction is disposed along a path which image signals are viewed by an observer when the device is running, i.e. the retardation film is arranged between an image display part generating image signals and the observer. The retardation film may control optical characteristics of the image signals generated by the image display part and then transfer them to the observer in order to solve problems such as crosstalk or a decline in viewing angles without a decrease in brightness and may also improve stereoscopic image quality. The term "device is running" used herein refers to a state when the device is displaying stereoscopic images.

As long as the retardation film has a phase difference in the thickness direction, preferably a positive phase difference in the thickness direction, various retardation films known in this field, for example, a +C plate or a +B plate, may be used. The +C plate used herein means a film satisfying a relationship of Formula 1 and the +B plate used herein means a film satisfying a relationship of Formula 2 or 3 below.

$$N_x = N_y < N_z \quad [\text{Formula 1}]$$

$$N_x \neq N_y \neq N_z \quad [\text{Formula 2}]$$

$$N_x \neq N_y < N_z \quad [\text{Formula 3}]$$

wherein $N_x$ represents an in-plane refractive index in the slow axis direction of the retardation film, $N_y$ represents an in-plane refractive index in the fast axis direction of the retardation film, and $N_z$ represents a refractive index in the thickness direction of the retardation film.

In the above, a phase difference ($R_{th}$) in the thickness direction of the retardation film may be calculated by Formula 4, and a phase difference ($R_{in}$) in the plane direction of the retardation film may be calculated by Formula 5 below.

$$R_{th} = d \times (N_z - N_y) \quad [\text{Formula 4}]$$

$$R_{in} = d \times (N_y - N_x) \quad [\text{Formula 5}]$$

wherein $N_x$, $N_y$ and $N_z$ are the same as defined in Formulas 1 to 3, and d represents a thickness of the retardation film.

There is a widely known method in this field for measuring $N_x$, $N_y$, $N_z$, $R_{th}$ and $R_{in}$ of the retardation film, whereby a person skilled in the art can easily measure $N_x$, $N_y$, $N_z$, $R_{th}$ and $R_{in}$ of the retardation film.

The range of the phase difference in the thickness direction of the retardation film is not particularly restricted, and may be determined depending on the kind of the stereoscopic image display device or the retardation film, and the like.

In one embodiment, the phase difference of the +C plate among the retardation films may satisfy a relationship of Formula 6 or 7, and the phase difference of the +B plate may satisfy any one relationship of Formulas 8 to 11 below.

$$Y_L \text{ or } Y_R = 0.0201X^2 - 0.0398X + 0.0339 \leq 0.5 \quad [\text{Formula 6}]$$

$$Y_L=0.0192X^2-0.0763X+0.0899\leq 0.5 \quad \text{[Formula 7]}$$

$$Y_R=(9.24\times 10^{-7})X^2-0.000236X+0.0288\leq 0.5 \quad \text{[Formula 8]}$$

$$Y_L=(5.5\times 10^{-7})X^2-0.000347X+0.067\leq 0.5 \quad \text{[Formula 9]}$$

$$Y_R=(1.97\times 10^{-6})X^2-0.000616X+0.0644\leq 0.5 \quad \text{[Formula 10]}$$

$$Y_L=(1.99\times 10^{-6})X^2-0.00125X+0.206\leq 0.5 \quad \text{[Formula 11]}$$

wherein X of the Formulas 6 and 7 is a phase difference in the thickness direction of the +C plate, and X of the Formulas 8 to 11 is a phase difference in the thickness direction of the +B plate.

Also, $Y_L$ of Formulas 6 to 11 represents a crosstalk ratio (unit: cd/m$^2$) in the left eye of an observer while running the stereoscopic image device. $Y_L$ may be preferably 0.3 or less, more preferably 0.1 or less, more still 0.05 or less, and most preferably 0.01 or less. Further, the $Y_R$ represents a crosstalk ratio (unit: cd/m$^2$) in the right eye of an observer while running the stereoscopic image device. $Y_R$ may be preferably 0.3 or less, more preferably 0.1 or less, more still 0.05 or less, and most preferably 0.01 or less.

According to Formulas 6 to 11, the phase differences in the thickness direction in the retardation film, of a region through which image light for the right eye passes and a region through which image light for the left eye passes, may be designed to be identical to each other or different from each other. In the above, the distinction between the image light for the right eye and the image light for the left eye is not particularly restricted. For example, when the device is a polarizing glasses type device comprising a polarization control layer, to be described below, distinction between the image light for the right eye and the left eye may be defined by the context below, depending on the kind of polarization control layer.

When the phase differences are designed to be different from each other, in the +C plate, the phase differences in the thickness direction of a region through which image light for the right eye passes and a region through which image light for the left eye passes, may satisfy a relationship of Formula 6; or the phase difference in the thickness direction of a region through which image light for the right eye passes may satisfy a relationship of Formula 6 and the phase difference in the thickness direction of a region through which image light for the left eye passes may satisfy Formula 7, but is not limited thereto. Also, in the +B plate, the phase difference in the thickness direction of a region through which image light for the right eye passes may satisfy Formula 8 and the phase difference in the thickness direction of a region through which image light for the left eye passes may satisfy Formula 9; or the phase difference in the thickness direction of a region through which image light for the right eye passes may satisfy Formula 10 and the phase difference in the thickness direction of a region through which image light for the left eye passes may satisfy Formula 11, but is not limited thereto.

In one embodiment, the phase difference in the thickness direction of the retardation film may be, for example, 30 nm to 350 nm. Further, in cases where the retardation film is a +B plate, the film may have a phase difference in the plane direction as well as a phase difference in the thickness direction, and the phase difference in the plane direction may be suitably selected considering the stereoscopic image quality and, for instance, may be selected in a range of about 120 nm to 160 nm.

However, the ranges of phase differences are only an illustrative example, and the phase differences ($R_{th}$ and $R_{in}$) may be designed according to the kind or specific constitution of display devices. Preferably, embodiments of such controls may be performed according to the above Formulas.

The image display part included in the device is not particularly limited to any kind, and all the image display parts used in various stereoscopic image display devices known in this field, including glasses types or glasses-free types, may be used.

In one embodiment, the device may be a glasses type, particularly, a polarization glasses type stereoscopic image display device. The image display part may comprise an image generation part which may generate image signals, comprising image light for the right eye and image light for the left eye, and then transfer them to the observer's side; and a polarization control layer that is disposed in the observer's side from the image generation part and is capable of, if the image signals are entered therein, controlling the image signals such that the image light for the right eye and image light for the left eye have different polarization states from each other, and is also capable of then transferring them to the observer's side.

FIG. 1 is a drawing representing one aspect of a stereoscopic image display device (1) as above.

The image generation part included in the illustrative device (1) of FIG. 1 may comprise a light source (11), a first polarizing plate (12), an image generation layer (13) and a second polarizing plate (14), and a polarization control layer (15) may be disposed on the observer (17)'s side of the image generation part.

In one embodiment, the observer (17) can wear polarizing glasses to observe the stereoscopic image. The polarizing glasses may, for example, have a lens for the right eye and a lens for the left eye, and the lenses for the right eye and the left eye may comprise a polarizing plate respectively. By designing the polarizing plates in each lens to have different absorption axes, for example, controlling an absorption axis of a polarizing plate in the lens for the right eye and an absorption axis of a polarizing plate in the lens for the left eye to be perpendicular to each other, it is possible for image light for the left eye to be viewed only by the left eye, and for image light for the right eye to be viewed only by the right eye. In one embodiment, the lenses for the right eye and the left eye may further comprise a $\lambda/4$ wavelength layer together with the polarizing plate respectively. In this case, the absorption axes of the polarizing plates do not have to be always different from each other. For example, in the above embodiment, by controlling the polarizing plates of the lenses for the right eye and the left eye to have absorption axes parallel to each other, and also controlling the $\lambda/4$ wavelength layers of the lenses for the right eye and the left eye to have optical axes in a direction different from each other, for example, designing the optical axes of the $\lambda/4$ wavelength layers in the lenses for the right eye and the left eye to be perpendicular to each other, it is possible for image light for the left eye to be viewed only by the left eye and for image light for the right eye to be viewed only by the right eye. Also, a method of controlling the polarizing plates of the lenses for the right eye and the left eye to have directions different from each other and also controlling the optical axes of the $\lambda/4$ wavelength layers in the lenses for the right eye and the left eye to be parallel to each other may be used as well. The term "$\lambda/4$ wavelength layer" used herein means a phase retardation element which is capable of retarding a phase of incident light to an extent of $\frac{1}{4}$ wavelength of the incident light's wavelength.

In the device (1) of FIG. 1, the light source (11) is part of the image generation part, and, for example, may emit the unpolarized white light in a state of using the device (1) toward the polarizing plate (12). As the light source (11), for example, a direct type or edge type back light unit (BLU), which is usually used in liquid crystal display devices, may be used.

In the device (1) of FIG. 1, the first polarizing plate (12) is disposed on the side of the light source (11). The first polarizing plate (12) may have a transmission axis and an absorption axis perpendicular to the transmission axis. When light emitted from the light source (11) is viewed, only light having a polarization axis parallel to the transmission axis among the incident light can pass through the first polarizing plate (12). The direction of the polarization axis may be in a vibration direction of an electric field.

In the device (1) of FIG. 1, the image generation layer (13) may be, for example, a transmission liquid crystal display device, in which single pixel or a plurality of pixels capable of generating image light for the right eye or the left eye are arranged in a direction of columns and/or rows. Such a display panel may generate image signals comprising image light for the left eye and the right eye by displaying each pixel according to signals in a state of using the device (1) and transmit the resulting image signals to the second polarizing plate (14). The display panel may comprise, for example, a substrate, a pixel electrode, an alignment layer, a liquid crystal layer, another alignment layer, a common electrode, a color filter and a substrate, which are disposed in order from the light source (11). In the display panel, a single pixel or at least two pixels may form an image generation region (UR) for the right eye or an image generation region (UL) for the left eye. The image generation regions (UL) for the left eye and the image generation regions (UR) for the right eye may, for example, be arranged in alternating band patterns extended to common directions as shown in FIG. 2 or arranged in a lattice pattern as shown in FIG. 3.

When running the stereoscopic image display device, the image generation regions for the right eye and the left eye generate images for the right eye and image for the left eye, respectively. For example, in the case of the illustrative device (1) of FIG. 1, when the light emitted from the light source (11) passes through the first polarizing plate (12) and then enters into the display part (13), the light which passes through the image generation region (R) for the right eye becomes an image for the right eye and the light which passes through the image generation region (L) for the left eye becomes an image for the left eye. In one embodiment, the image for the right eye and the left eye may be linearly polarized light having each polarization axis in a specific direction, and these polarization axes may have directions parallel to each other.

In the device (1) of FIG. 1, the second polarizing plate (14) is disposed toward the observer's side. When the light for the right eye and the left eye enter into the second polarizing plate (14), only light parallel to the transmission axis of the polarizing plate (14) may pass through the polarizing plate (14). In one embodiment, the transmission axes of the first and second polarizing plates (12, 14) may be disposed, such that they form a 90 degree angle to each other, respectively.

In the device (1) of FIG. 1, the polarization control layer (15) includes a polarization control region (AR) for image light for the right eye and a polarization control region (AL) for image light for the left eye. The polarization control region (AR) for image light for the right eye is a region controlling the polarization state of the image light for the right eye which is generated and transmitted from the image generation region (UR) for the right eye, and may be arranged such that the image light for the right eye may be entered into. The polarization control region (AL) for image light for the left eye is a region controlling the polarization state of image light for the left eye generated and transmitted from the image generation region (UL) for the left eye, and may be arranged such that the image light for the left eye may be entered into. For example, if the image generation regions for the right eye and the left eye in the image generation layer (13) are disposed in a form as in FIG. 2, the polarization control regions (AR, AL) may be disposed in a form as FIG. 4 in accordance with this, and if the image generation regions (UR, UL) are disposed as in FIG. 3, the polarization control regions (AR, AL) may be disposed in a form as FIG. 5 in accordance with this, but is not limited thereto.

The image light for the right eye and the left eye after passing through the polarization control layer (15) have different polarization states from each other. In one embodiment, the image light for the right eye and the left eye may include light which is linearly polarized to have directions substantially perpendicular to each other, or may include left-handed circularly-polarized light or right-handed circularly-polarized light.

As illustratively shown in FIG. 1, a retardation film (16) is arranged in the device (1) between the image generation part and an observer (17). The retardation film (16) has a phase difference in the thickness direction, and is arranged such that image signals may pass through the film (16) according to its thickness direction as the image signals are transferred to the observer (17). As shown in FIG. 1, in cases where a stereoscopic image display device is a polarizing glasses type device, the retardation film (16) may be integrated by being attached to the polarization control layer (15) in the image display part, or may be attached to the polarizing glasses worn by the observer (17).

In the device (1) of FIG. 1, the polarization control layer (15) comprises polarization control regions (AR, AL) for image light for the right eye and the left eye, and the image light for the right eye and the left eye which after passing through the control layer (15) may be linearly polarized to have substantially perpendicular directions to each other, or may be left-handed circularly- and right-handed circularly-polarized.

In one embodiment, when the image light for the right eye and the left eye are left-handed circularly-polarized light or right-handed circularly-polarized lights, respectively, the polarization control layer may comprise polarization control regions for image light for the right eye and polarization control regions for image light for the left eye, and the control layer also includes λ/4 wavelength layers disposed on both of the polarization control regions for image light for the right eye and the left eye, and also the λ/4 wavelength layer in the polarization control regions for image light for the right eye and the λ/4 wavelength layer in the polarization control regions for image light for the left eye may have different optical axes from each other. The optical axis herein may mean a fast axis or a slow axis when the incident light passes through the corresponding regions. The optical axis of the λ/4 wavelength layer in the polarization control regions for image light for the right eye and the optical axis of the λ/4 wavelength layer in the polarization control regions for image light for the left eye may form an angle of 90 degrees to each other. Hereinafter, the polarization control layer as described above may be referred to as "a patterned λ/4 wavelength layer." In another embodiment, the polarization control layer generating the left-handed circularly-polarized light and right-handed circularly-polarized light may comprise polarization control regions for image light for the right eye and polarization control regions for image light for the left eye, and the control layer also includes λ/4 wavelength layers in the polarization control regions for image light for the right eye and the left eye and a λ/2 wavelength layer in only any one region of polarization control regions for image light for the right eye and the left eye. Hereinafter, such a polarization control layer may be referred to as "a ($\lambda$/2+$\lambda$/4) wavelength layer." In addition, the definition of the $\lambda$/4 wavelength layer is the same as mentioned above, and the term "$\lambda$/2 wavelength layer" used herein means a phase retardation element which is capable of retarding a phase of incident light to an extent of ½ wavelength of the incident light's wavelength.

When the image signals emitted from the polarization control layer includes the left-handed circularly-polarized light and right-handed circularly-polarized light above, the observer in order to appropriately observe the image signals may wear polarizing glasses, which includes lenses for the right eye and the left eye, the lenses for the right eye and the left eye including a $\lambda$/4 wavelength layer and a polarizing plate respectively. Hereinafter, the polarizing glasses comprising the $\lambda$/4 wavelength layer as above may be referred to as circularly polarizing glasses. Further, in one embodiment, the lenses for the right eye and the left eye in the circularly polarizing glasses may respectively comprise a lens, a polarizing plate and a $\lambda$/4 wavelength layer in order from the observer's side when one wears the glasses. Further, the image signals as described above may also be observed by wearing polarizing glasses, which comprise lenses for the right eye and the left eye, the lenses for the right eye and the left eye comprising a polarizing plate. Hereinafter, such polarizing glasses may be referred to as linearly polarizing glasses. The optical axis of the wavelength layer and the absorption axis of the polarizing plate in the circularly polarizing and linearly polarizing glasses may be controlled as mentioned above.

In the polarizing glasses type device, when the polarization control layer is a ($\lambda$/2+$\lambda$/4) wavelength layer, the retardation film may be a +C or +B plate.

In this specification, when the polarization control layer is the ($\lambda$/2+$\lambda$/4) wavelength layer, light that has passed through the region on which only the $\lambda$/4 wavelength layer is present in the polarization control layer may be referred to as the image light for the right eye; and light that has passed through the region on which the $\lambda$/2 wavelength layer and the $\lambda$/4 wavelength layer are simultaneously present in the polarization control layer may be referred to as the image light for the left eye.

In the above, in cases where the retardation film is a +C plate, the phase difference in the thickness direction which is determined according to Formula 6 or 7 may be, for example, about 50 nm to 270 nm. Preferably, the phase difference in the thickness direction of the region through which the image light for the right eye passes in the +C plate may be controlled according to Formula 6, and may be for example, 140 nm to 200 nm and preferably 150 nm to 190 nm. Also, the phase difference in the thickness direction of the region through which the image light for the left eye passes may be controlled according to Formula 7, and may be, for example, 60 nm to 120 nm and preferably 70 nm to 110 nm. Further, in this case, it is preferred that the observer wears the above circularly polarizing glasses to observe the stereoscopic image display device, but is not limited thereto. In addition, as long as the above retardation film is disposed between the image display part and the observer, its position is not particularly limited. For example, it may be attached to the polarization control layer in the image display part or the front polarizing glasses. However, if image light for the right eye and image light for the left eye have different phase differences in the thickness direction from each other, the retardation film is preferably attached to the front of the polarizing glasses for convenience. However, even in the above case, it is also possible that the retardation film itself is patterned and integrated into the device, without attaching it to the front polarizing glasses.

Further, if the retardation film is a +B plate, the phase difference in the thickness direction determined according to the Formulas may be, for example, about 50 nm to 350 nm. In addition, in this case, the phase difference ($R_{in}$) in the plane direction of the +B plate may be, for example, about 120 nm to 160 nm. Preferably, the phase difference in the thickness direction of the region through which the image light for the right eye passes of the +B plate may be controlled according to Formula 8, and may be, for example, 150 nm to 350 nm and preferably 200 nm to 300 nm. Also, the phase difference in the thickness direction of the region through which the image light for the left eye passes of the +B plate may be controlled according to Formula 9, and may be, for example, 50 nm to 250 nm and preferably 100 nm to 150 nm. In this case, it is preferred that the region through which the image light for the left eye passes and the region through which the image light for the right eye passes have different phase differences in the thickness direction from each other. Furthermore, in this case, it is preferred that the observer wears the linearly polarizing glasses to observe the stereoscopic image display device, but is not limited thereto. In addition, the position for disposing the above retardation film may be the same as mentioned above.

In a polarizing glasses type device, if the polarization control layer is a patterned $\lambda$/4 wavelength layer, the retardation film may be the +C plate or the +B plate, but more preferably the +C plate.

In this specification, when the polarization control layer is a patterned $\lambda$/4 wavelength layer, light which has passed through any one $\lambda$/4 wavelength layer among the $\lambda$/4 wavelength layers having different optical axes from each other may be referred to as image light for the right eye, and light which has passed through the other one $\lambda$/4 wavelength layer among the $\lambda$/4 wavelength layers having different optical axes from each other may be referred to as image light for the left eye.

In the above, when the retardation film is a +C plate, the phase difference in the thickness direction determined according to the Formulas may be, for example, about 30 nm to 350 nm. Preferably, the phase difference in the thickness direction of the region through which the image light for the right eye passes in the +C plate may be controlled according to Formula 6, and, for example, may be 150 nm to 350 nm and preferably 200 nm to 300 nm. Further, the phase difference in the thickness direction of the region through which the image light for the left eye passes may be controlled according to Formula 6, and for example, may be 50 nm to 250 nm and preferably 100 nm to 150 nm. Further, in this case, it is preferred that the observer wears the circularly polarizing glasses to observe the stereoscopic image display device, but is not limited thereto. In addition, the position for disposing the above retardation film may be the same as mentioned above.

In a polarizing glasses type device as FIG. 1, when the polarization control layer generates the linearly polarized light to have substantially a perpendicular direction to each other, the polarization control layer may comprise the polarization control region for image light for the right eye and the polarization control region for image light for the left eye, and the control layer may include a $\lambda$/2 wavelength layer disposed on only any one region of the polarization control regions for the right eye and the left eye. The polarization control layer as described above may be referred to "a patterned $\lambda$/2 wavelength layer."

In the polarizing glasses type device, when the polarization control layer is the patterned λ/2 wavelength layer, the retardation film may be a +C plate or a +B plate, but more preferably the +B plate.

In this specification, when the polarization control layer is the patterned λ/2 wavelength layer, light which has passed through the region in which the λ/2 wavelength layer is not present in the polarization control layer may be referred to as the image light for the right eye, and light which has passed through the region in which the λ/2 wavelength layer is present in the polarization control layer may be referred to as the image light for the left eye.

Here, the phase difference in the thickness direction of the +B plate determined according to the Formula may be, for example, about 50 nm to 350 nm. In addition, in this case, the phase difference ($R_{in}$) in the plane direction of the +B plate may be, for example, about 120 nm to 160 nm. Preferably, the phase difference in the thickness direction of the region through which the image light for the right eye passes of the +B plate penetrates may be controlled according to Formula 10, and, for example, may be 150 nm to 350 nm and preferably 200 nm to 300 nm. Further, the phase difference in the thickness direction of the region through which the image light for the left eye passes may be controlled according to Formula 11, and, for example, may be 50 nm to 250 nm and preferably 100 nm to 200 nm. Further, in this case, it is preferred that the observer wears the above circularly polarizing glasses to observe the stereoscopic image display device, but is not limited thereto. In addition, the position for disposing the above retardation film may be the same as mentioned above.

The retardation film which may be used in the above description is not particularly limited to any specific kind, and various retardation films known in this field may be used, as long as they represent the phase difference characteristics as described above. In one embodiment, the retardation film may be a liquid crystal film, or a usual polymeric film. In cases of the polymeric film, it may be a polymeric film in which the phase difference is controlled in the thickness direction via mono-axial or biaxial stretching.

The present invention also relates to an optical filter for a stereoscopic image display device that includes a polarization control layer which is capable of controlling image signals comprising image light for the right eye and image light for the left eye such that the image light for the right eye and the image light for the left eye have different polarization states from each other, and is capable of then emitting them, if the image signals are entered; and a retardation film that is attached to the side of the control layer, from which the image signals are emitted that also has a phase difference in the thickness direction.

The optical filter, an optical filter that has a shape similar to the retardation film for improving image quality as mentioned above, is integrated by being attached to the polarization control layer, and may be applied to the aforementioned polarizing glasses type stereoscopic image display device. FIG. 6 represents one illustrative optical filter (6), in which the retardation film (16) is attached to the polarization control layer (15). The arrows in FIG. 6 represent the direction of passing image signals comprising image light for the left eye and the right eye when the stereoscopic image display device is running.

Therefore, the aforementioned context may be similarly applied to the specific kind of retardation film or values such as phase differences.

For example, the retardation film included in the optical filter is a +C plate, of which the phase difference may satisfy the relationship of Formula 6 or 7, or a +B plate, of which the phase difference may satisfy any one relationship of Formulas 8 to 11 below.

$$Y_L \text{ or } Y_R = 0.0201X^2 - 0.0398X + 0.0339 \leq 0.5 \quad \text{[Formula 6]}$$

$$Y_L = 0.0192X^2 - 0.0763X + 0.0899 \leq 0.5 \quad \text{[Formula 7]}$$

$$Y_R = (9.24 \times 10^{-7})X^2 - 0.000236X + 0.0288 \leq 0.5 \quad \text{[Formula 8]}$$

$$Y_L = (5.5 \times 10^{-7})X^2 - 0.000347X + 0.067 \leq 0.5 \quad \text{[Formula 9]}$$

$$Y_R = (1.97 \times 10^{-6})X^2 - 0.000616X + 0.0644 \leq 0.5 \quad \text{[Formula 10]}$$

$$Y_L = (1.99 \times 10^{-6})X^2 - 0.00125X + 0.206 \leq 0.5 \quad \text{[Formula 11]}$$

In the above Formulas, X of Formulas 6 and 7 is a phase difference in the thickness direction of the +C plate and X of Formulas 8 to 11 is a phase difference in the thickness direction of the +B plate.

$Y_R$ and $Y_L$ in Formulas 6 to 11 represents a crosstalk ratio ($Cd/m^2$) in the left eye and the right eye when running the stereoscopic image display device to which the optical filter is applied, respectively, and the values may be, individually or simultaneously, preferably 0.3 or less, more preferably 0.1 or less, more still 0.05 or less, and most preferably 0.01 or less.

Furthermore, the polarization control layer in the optical filter may constitute the polarization control layer in the aforementioned stereoscopic image display device, and may be, for example, the aforementioned patterned λ/2 or λ/4 wavelength layer or (λ/2+λ/4) wavelength layer. In the field of stereoscopic image display devices, various patterned λ/2 wavelength layers, patterned λ/4 wavelength layers or (λ/2+λ/4) wavelength layers or their embodying methods are known, and all the aforementioned known methods may be used for constituting the polarization control layer.

In cases where the optical filter is applied to the device, it may be disposed such that the polarization control layer is disposed on the side to which image signals generated from the image display part enter and the image signals that have passed through the polarization control layer are transmitted to the observer's side through the retardation film.

Also, a method of attaching the retardation film to the polarization control layer is not particularly limited, and the optical filter may be, for example, prepared by laminating them by using a conventional pressure sensitive adhesive.

The present invention also relates to polarizing glasses that are used for observing stereoscopic images and that has a lens for the right eye and a lens for the left eye. Each of the lenses for the right eye and the left eye includes a retardation film having a phase difference in the thickness direction and a polarizing plate.

The polarizing glasses may be used to observe images emitted from the polarizing glasses type stereoscopic image display device. The polarizing glasses may be the circularly polarizing glasses or the linearly polarizing glasses described above, on the front of which the retardation film for improving image quality is attached. FIG. 7 is a drawing representing illustrative polarizing glasses. FIG. 7(A) represents polarizing glasses which comprise a lens for the left eye positioned at the left eye (LE) of the observer comprising a polarizing plate (71L) and a retardation film (72L), and a lens for the right eye positioned on the right eye (RE) comprising a polarizing plate (71R) and a retardation film (72R). The arrows in FIGS. 7(A) and (B) represent the direction of image signals displayed to the observer.

Accordingly, the aforementioned context may be similarly applied to the specific kind of the retardation film or values such as phase differences.

For example, the retardation film included in the polarizing glasses is a +C plate, of which the phase difference may satisfy the relationship of Formula 6 or 7, or a +B plate, of which the phase difference may satisfy any one relationship of Formulas 8 to 11 below.

$$Y_L \text{ or } Y_R = 0.0201X^2 - 0.0398X + 0.0339 \leq 0.5 \quad \text{[Formula 6]}$$

$$Y_L = 0.0192X^2 - 0.0763X + 0.0899 \leq 0.5 \quad \text{[Formula 7]}$$

$$Y_R = (9.24 \times 10^{-7})X^2 - 0.000236X + 0.0288 \leq 0.5 \quad \text{[Formula 8]}$$

$$Y_L = (5.5 \times 10^{-7})X^2 - 0.000347X + 0.067 \leq 0.5 \quad \text{[Formula 9]}$$

$$Y_R = (1.97 \times 10^{-6})X^2 - 0.000616X + 0.0644 \leq 0.5 \quad \text{[Formula 10]}$$

$$Y_L = (1.99 \times 10^{-6})X^2 - 0.00125X + 0.206 \leq 0.5 \quad \text{[Formula 11]}$$

In the above Formulas, X in Formulas 6 and 7 is a phase difference in the thickness direction of the +C plate and X in Formulas 8 to 11 is a phase difference in the thickness direction of the +B plate.

$Y_R$ and $Y_L$ in Formulas 6 to 11 represents a crosstalk ratio (Cd/m$^2$) in the left eye and the right eye during the procedure of observing stereoscopic images using the polarizing glasses, respectively, and the values may be, individually or simultaneously, preferably 0.3 or less, more preferably 0.1 or less, more still 0.05 or less, and most preferably 0.01 or less.

Further, in cases where the polarizing glasses are the circularly polarizing glasses, the lenses for the left eye and the right eye may further comprise λ/4 wavelength layers. In this case, as mentioned above, absorption axes of the polarizing plates included in the lenses for the right eye and the left eye may be in parallel directions to each other and the λ/4 wavelength layers included in the lenses for the right eye and the left eye may have different optical axes from each other. In other embodiments, absorption axes of the polarizing plates included in the lenses for the right eye and the left eye may have different directions from each other and the λ/4 wavelength layers included in the lenses for the right eye and the left eye may have optical axes parallel to each other.

FIG. 7(B) is an illustrative drawing of polarizing glasses, and represents polarizing glasses which comprise a lens for the left eye positioned at the left eye (LE) of the observer comprising a polarizing plate (71L), a λ/4 wavelength layer (73L) and a retardation film (72L), and a lens for the right eye positioned on the right eye (RE) comprising a polarizing plate (71R), a λ/4 wavelength layer (73R) and a retardation film (72R).

The present invention also relates to a method for improving the quality of stereoscopic images displayed by an image display part that is capable of generating image signals comprising image light for the right eye and the left eye to be viewed by the right eye and the left eye of an observer, respectively, and then transferring them to the observer's side. The method comprising a step of disposing a retardation film having a phase difference in the thickness direction such that the image signals emitted from the image display part may pass through the retardation film in the thickness direction and then be transferred to the observer's side.

In one embodiment, the method for improving the quality of stereoscopic images may be a method for preparing the stereoscopic image display device, the optical filter or the polarizing glasses, in which the quality of stereoscopic images may be improved by positioning the retardation film between the image display part and the observer, or a method for using the stereoscopic image display device, in which the observer wears the polarizing glasses and then observes the stereoscopic images.

Therefore, the aforementioned context may be similarly applied to the specific kind of retardation film, phase difference values and disposition within devices or glasses in the above method.

For example, the retardation film included in the method is a +C plate, of which the phase difference may satisfy the relationship of Formula 6 or 7, or a +B plate, of which the phase difference may satisfy any one relationship of Formulas 8 to 11.

$$Y_L \text{ or } Y_R = 0.0201X^2 - 0.0398X + 0.0339 \leq 0.5 \quad \text{[Formula 6]}$$

$$Y_L = 0.0192X^2 - 0.0763X + 0.0899 \leq 0.5 \quad \text{[Formula 7]}$$

$$Y_R = (9.24 \times 10^{-7})X^2 - 0.000236X + 0.0288 \leq 0.5 \quad \text{[Formula 8]}$$

$$Y_L = (5.5 \times 10^{-7})X^2 - 0.000347X + 0.067 \leq 0.5 \quad \text{[Formula 9]}$$

$$Y_R = (1.97 \times 10^{-6})X^2 - 0.000616X + 0.0644 \leq 0.5 \quad \text{[Formula 10]}$$

$$Y_L = (1.99 \times 10^{-6})X^2 - 0.00125X + 0.206 \leq 0.5 \quad \text{[Formula 11]}$$

In the above Formulas, X in Formulas 6 and 7 is a phase difference in the thickness direction of the +C plate and X in Formulas 8 to 11 is a phase difference in the thickness direction of the +B plate.

$Y_R$ and $Y_L$ in Formulas 6 to 11 represent crosstalk ratios (Cd/m$^2$) in the left eye and the right eye when running the stereoscopic image display device, respectively, and the values may be, individually or simultaneously, preferably 0.3 or less, more preferably 0.1 or less, more still 0.05 or less, and most preferably 0.01 or less.

In cases where the method is a method of preparing the stereoscopic image display device, the optical filter or the polarizing glasses, and the like, as long as the method includes a step of positioning the retardation film at a suitable position, the other specific steps or the kind of elements used, and the like are not particularly limited and all conventional contents known in this field may be applied thereto.

Advantageous Effects

The present invention may provide a stereoscopic image display device, which is capable of preventing crosstalk or reduction of viewing angles, and also preventing reduction of brightness upon displaying stereoscopic images while improving image quality such as contrast ratio; an optical filter for the stereoscopic image display device; polarizing glasses for observing stereoscopic images; or a method of improving stereoscopic image quality.

BRIEF DESCRIPTION OF DRAWINGS

FIGS. 2 and 3 are drawings illustratively depicting disposition of image generation regions for the right eye and the left eye in a stereoscopic image display device.

FIGS. 4 and 5 are drawings illustratively depicting disposition of polarization control regions for the right eye and the left eye in a polarization control layer of a stereoscopic image display device.

MODE FOR INVENTION

Figure 1:
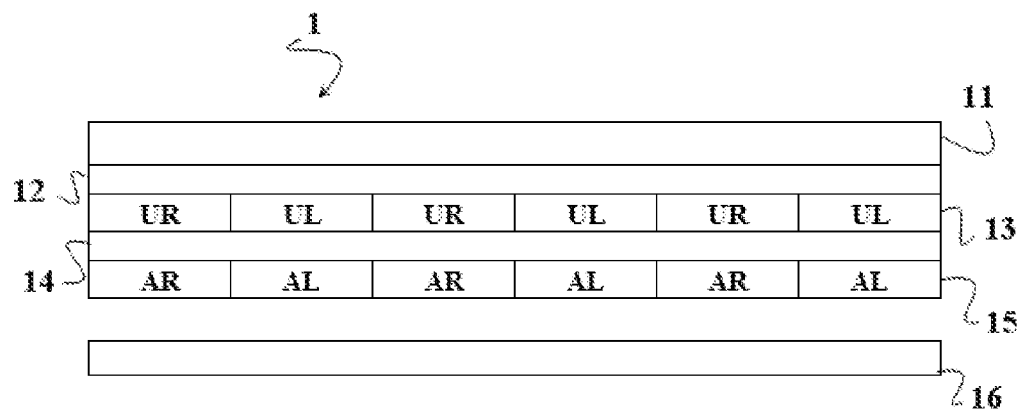
FIG. 1 is a cross-sectional view depicting one illustrative display device.
Figure 1:
Figure 2:
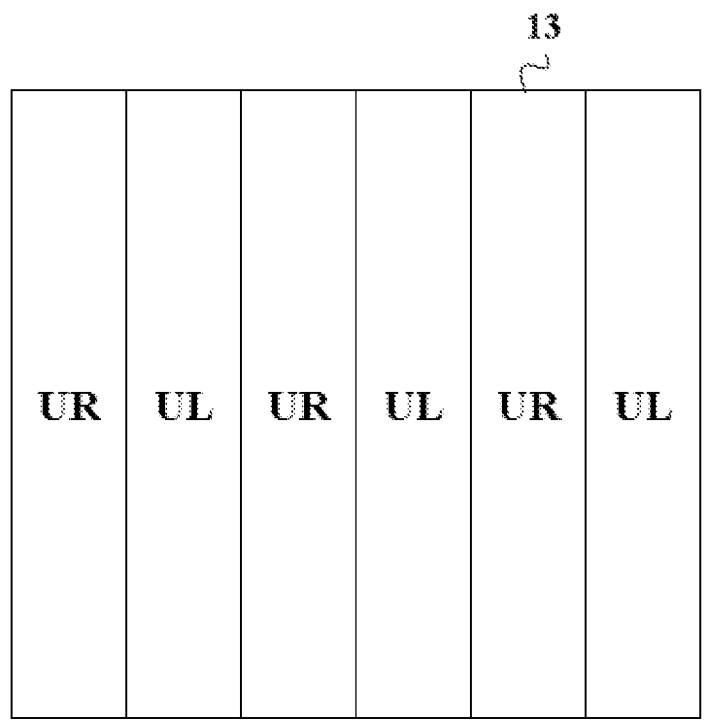
Figure 4:
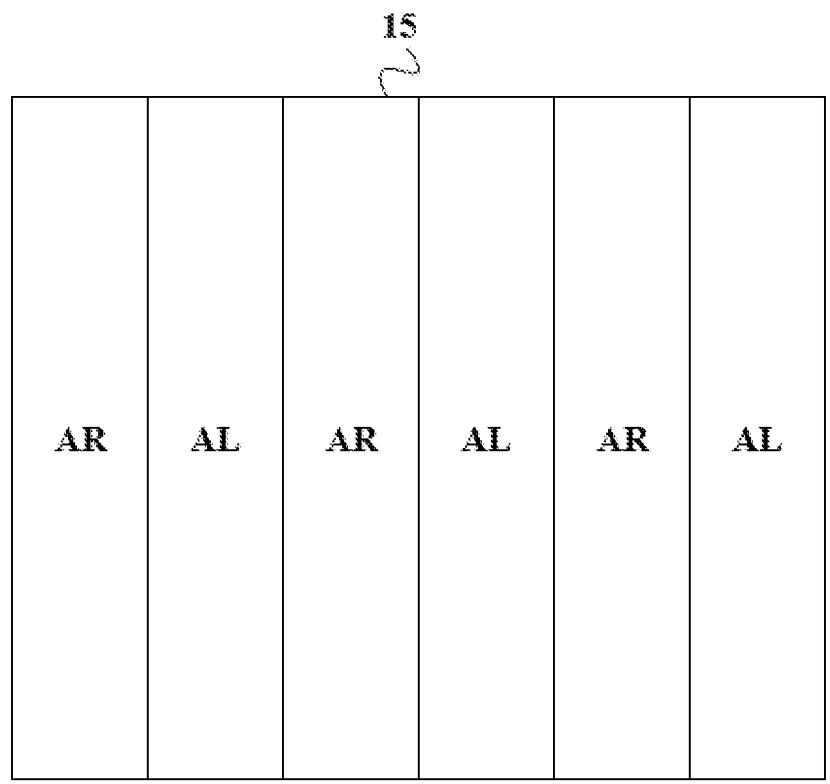
Figure 6:
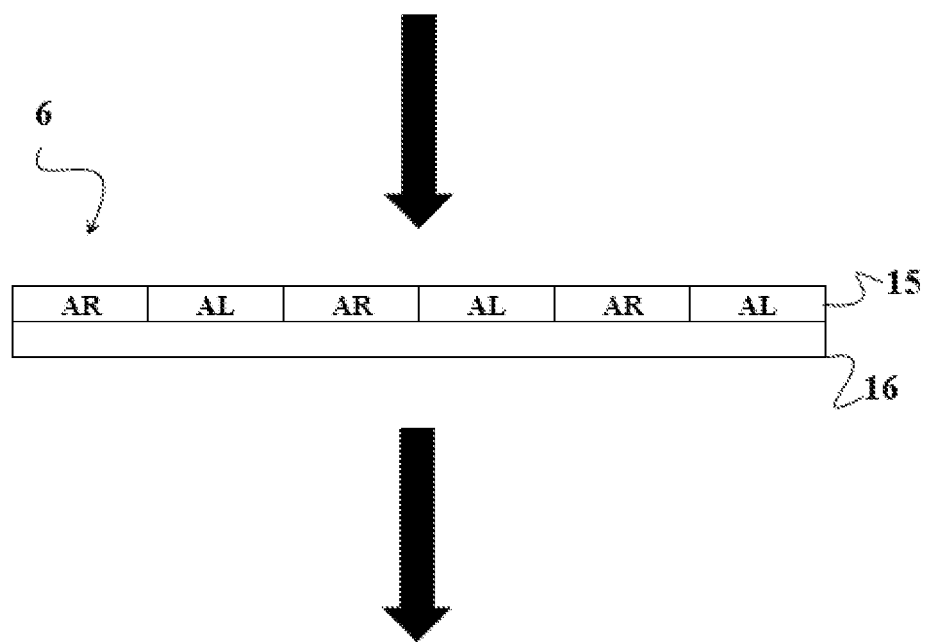
FIG. 6 is a drawing depicting an illustrative optical filter for a stereoscopic image display device.
Figure 7:
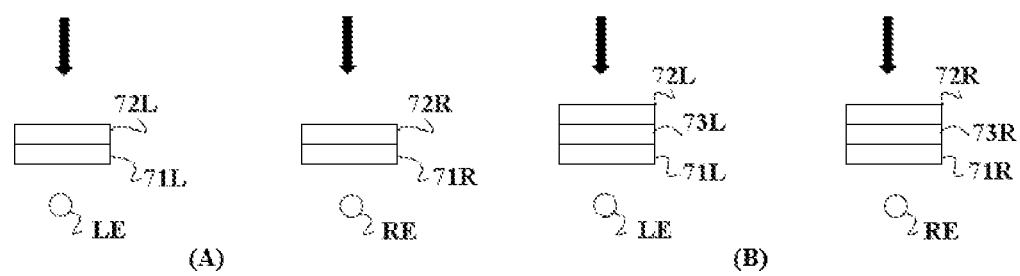
FIG. 7 is a drawing depicting illustrative polarization glasses for observing stereoscopic image.

The present invention is explained in more detail via examples according to the present invention and comparative examples not according to the present invention, but the scope of the present invention is not limited to the following examples.

In this specification, physical properties are measured by the methods as described below.

1. Phase Difference of Retardation Film

Phase differences of retardation films may be measured using light having a wavelength of 550 nm or 589 nm. The phase difference may be extracted from sixteen Muller matrices of the retardation film which are measured by Axoscan (manufactured by Axomatrics), an instrument capable of measuring sixteen Muller matrices according to the manufacturer's manual.

2. Method of Evaluating Crosstalk Ratio

The crosstalk ratio of the stereoscopic image device may be defined as a ratio of brightness between a dark state and a bright sate. According to the kind of stereoscopic image device, various methods for measuring the crosstalk ratios are known in this field. For example, the crosstalk ratio in the Examples using a polarizing glasses type stereoscopic image display device may be measured by the following method. Firstly, polarizing glasses for observing stereoscopic image are positioned at a conventional observing point of the stereoscopic image display device. In the above, the conventional observing point is a point where it is 3/2 times as long as the horizontal length of the device away from the center of the device. The polarizing glasses are positioned under the condition where they point to the center of the device at the conventional observing point. The horizontal length may be a length in the horizontal direction of the device, with respect to the observer who is observing the stereoscopic image, i.e. may be a breadthwise length of the device. In the above disposition, under the state where the device displays images for the left eye, a brightness measuring meter (SR-U2 Spectrometer) is arranged behind the lenses for the left eye and the right eye of the polarizing glasses respectively, and then the brightness behind the lens of the left eye and the brightness behind the lens for the right eye are measured. In the above, the brightness behind the lens for the left eye is brightness in a bright state, and the brightness measured behind the lens for the right eye is brightness in a dark state. After measuring the brightness, a ratio of the brightness in a dark state with respect to the brightness in a bright state ([brightness in a dark state]/[brightness in a bright state]) is calculated, which may be referred to as a crosstalk ratio ($Y_L$) in the left eye. Further, the crosstalk ratio ($Y_R$) in the right eye may be measured by the same method as above, specifically, it may be calculated by measuring the brightness in bright and dark states under the state where the stereoscopic image display device displays images for the right eye. In this case, the brightness behind the lens for the right eye is brightness in a bright state, and the brightness measured behind the lens for the left eye is brightness in a dark state. Also, the ratio ([brightness in a dark sate/brightness in a bright state]) may be identically referred to as a crosstalk ratio ($Y_R$).

3. Method of Evaluating Crosstalk Ratios According to Horizontal Viewing Angles

The crosstalk ratios according to horizontal viewing angles may be evaluated by the following method. As described in the method for evaluating crosstalk ratios in the above item 2, the polarizing glasses for observing stereoscopic images is positioned at the conventional observing point of the device, and then the crosstalk ratios ($Y_L$ and $Y_R$) are measured by the same method as in the above item 2, by changing the observation angle by 5 degrees from 0 to 80 degrees in the horizontal direction with reference to the observer. Here, the observation angle is obtained by measuring an angle such that the line of sight of the observer is changed from the baseline (0 degree) in the horizontal direction, with reference to the angle of the line of sight of the observer when the observer observes the center of the device at the conventional observing point. Furthermore, the crosstalk ratio in the above item 2 is a value measured at the observation angle of 0 degree.

4. Method of Evaluating Brightness to Crosstalk According to Horizontal Viewing Angles As described in the method for measuring crosstalk ratio in the above item 3, the polarizing glasses for observing stereoscopic images is positioned at the conventional observing point of the device, and then the crosstalk brightness according to horizontal viewing angles is measured by the same method as in the above item 2, by changing the observation angle by 5 degrees from 0 to 80 degrees in the horizontal direction with reference to the observer. The crosstalk brightness ($CR_{left}$) in the left eye according to horizontal viewing angles is calculated by Formula 12, and the crosstalk brightness ($CR_{right}$) in the right eye according to horizontal viewing angles by Formula 13.

$CR_{left}$=Brightness of image light for the left eye passing through a region for the left eye in the polarizing glasses/Crosstalk ratio in the left eye ($Y_L$) [Formula 12]

$CR_{right}$=Brightness of image light for the right eye passing through a region for the right eye in the polarizing glasses/Crosstalk ratio in the right eye ($Y_R$) [Formula 13]

EXAMPLE 1

Figure 8:
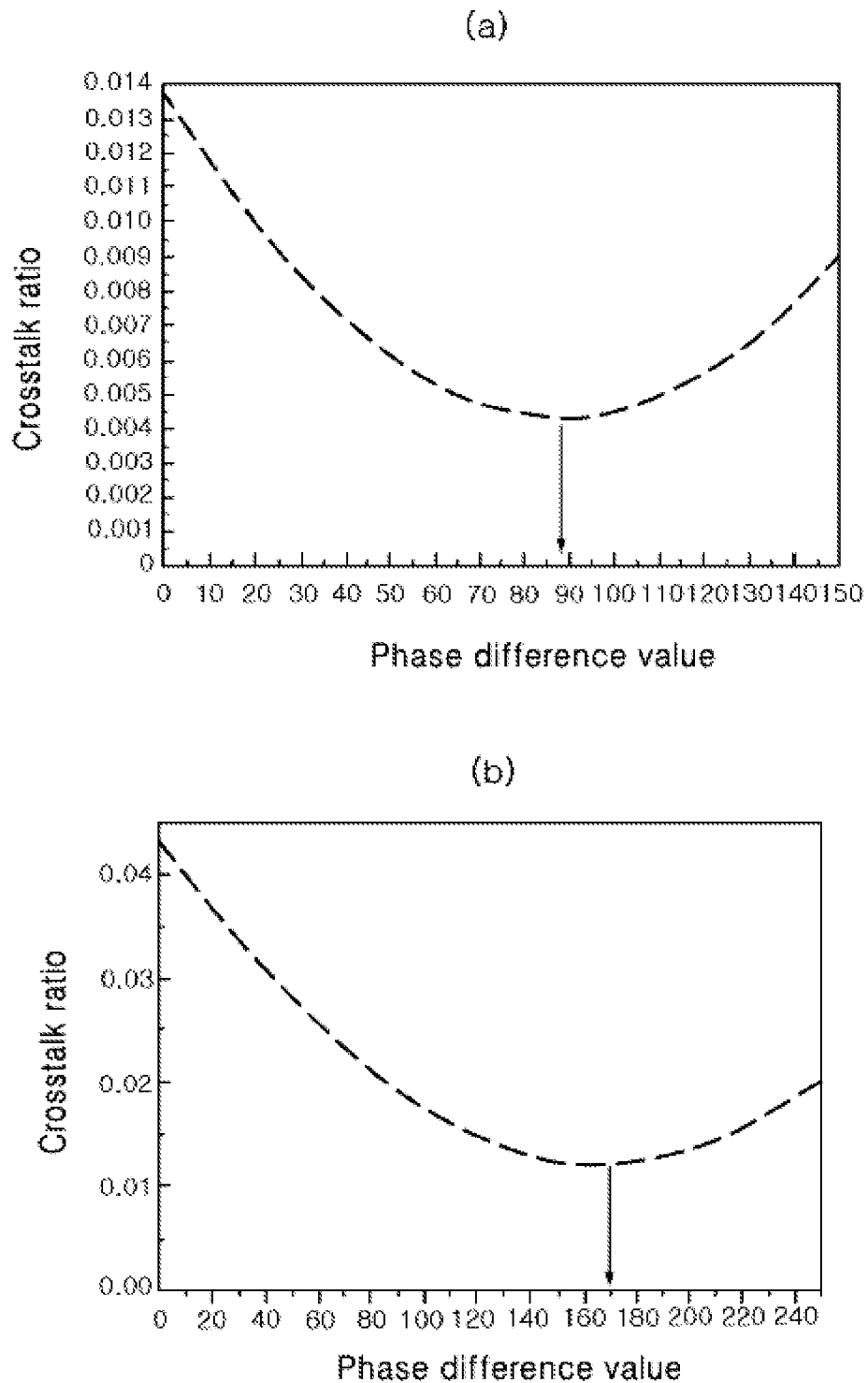
FIGS. 8 to 16 are drawings for explaining the measuring results.

A device that had a structure as represented in FIG. 1 and included a polarization control layer (15 in FIG. 1) (($\lambda/2+\lambda/4$) wavelength layer) was prepared. In the polarization control layer (15 in FIG. 1) (($\lambda/2+\lambda/4$) wavelength layer), a $\lambda/4$ wavelength layer that has a slow axis forming 45 degrees with a transmission axis of the polarizing plate (14 in FIG. 1) was positioned in polarization control regions (R of 15 in FIG. 1) for image light for the right eye; and a $\lambda/2$ wavelength layer that has a slow axis forming −45 degrees with the transmission axis of a polarizing plate (14 in FIG. 1) and a $\lambda/4$ wavelength layer that has a slow axis forming 45 degrees with the transmission axis of a polarizing plate (14 in FIG. 1) were positioned in polarization control regions (L of 15 in FIG. 1) of image light for the left eye. Then, using polarizing glasses (circularly-polarized glasses) having lenses for the right eye and the left eye, in which a polarizing film having a transmission axis formed at 90 degrees with the transmission axis of the polarizing plate (14 in FIG. 1), a $\lambda/4$ wavelength layer having a slow axis forming 45 degrees with the transmission axis of the polarizing plate (14 in FIG. 1) and a +C plate were sequentially attached on the lens for the right eye, and a polarizing film having a transmission axis formed at 90 degrees with the transmission axis of the polarizing plate (14 in FIG. 1), a $\lambda/4$ wavelength layer having a slow axis forming −45 degrees with the transmission axis of the polarizing plate (14 in FIG. 1) and a +C plate were sequentially attached on the lens for the left eye, images emitted from the stereoscopic image display device were observed. In the above procedure, crosstalk ratios in the left eye or the right eye were measured, with changing phase differences in the thickness direction of the +C plates attached to the lenses for the left eye and the right eye, and the results were depicted in FIG. 8. The +C plate was a usual liquid crystal type retardation film, in which a retardation film prepared by using vertically aligned photo-curable liquid crystals having birefringence (Δn) of 0.1 were used. FIG. 8(*a*) *represents a crosstalk ratio* ($Y_L$) in the left eye of the above case, in which the x axis represents a phase difference (unit: nm) in the thickness direction of the +C plate, and the y axis represents a crosstalk ratio (Cd/m$^2$). In addition, FIG. 8(*b*) represents a crosstalk ratio ($Y_R$) in the right eye, in which the x axis represents a phase difference (unit: nm) in the thickness direction of the +C plate, and the y axis represents a crosstalk ratio (Cd/m$^2$).

EXAMPLE 2

The stereoscopic image display device and the polarizing glasses were prepared by the same method as Example 1, except that considering the results of Example 1, a +C plate (liquid crystal type retardation film prepared by coating vertically aligned photo-curable liquid crystals having birefringence (Δn) of 0.1 in a thickness of 1.7 μm) having a phase difference in the thickness direction of 170 nm was attached to the lens for the right eye and a +C plate (liquid crystal type retardation film prepared by coating vertically aligned photo-curable liquid crystals having birefringence (Δn) of 0.1 in a thickness of 0.9 μm) having a phase difference in the thickness direction of 90 nm was attached to the lens for the left eye.

COMPARATIVE EXAMPLE 1

The stereoscopic image display device and the polarizing glasses were prepared by the same method as Example 2, except that +C plates were not attached to the lenses for the right eye and the left eye.

EXPERIMENTAL EXAMPLE 1

Figure 9:
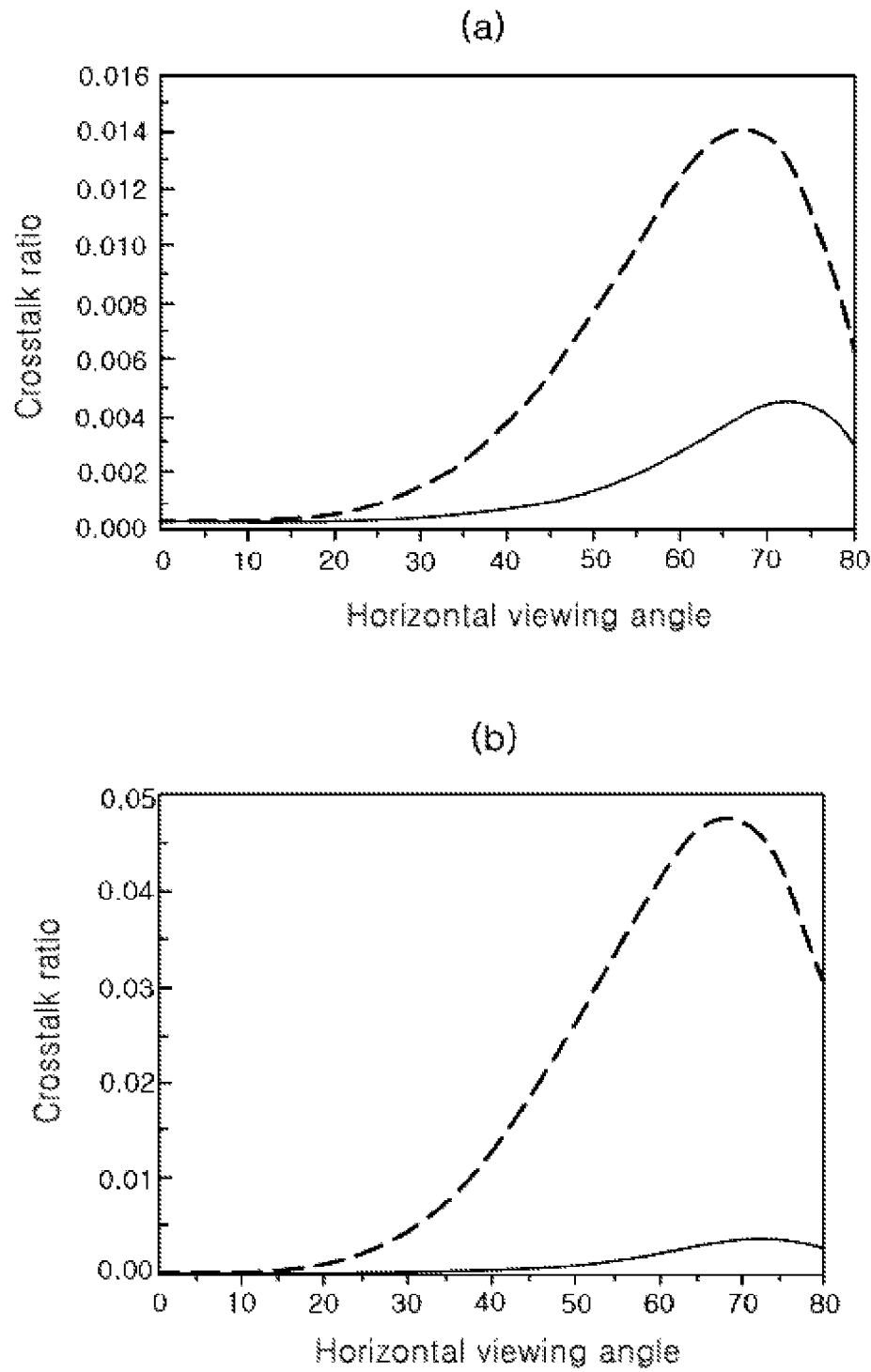

When using the devices in Example 2 and Comparative Example 1, crosstalk ratios of image light for the left eye and image light for the right eye according to horizontal viewing angles were measured by the method above, and depicted in FIG. 9. FIG. 9(*a*) represents a crosstalk ratio in the left eye according to horizontal viewing angles, in which the x axis represents a horizontal viewing angle (unit: degree), and the y axis represents a crosstalk ratio (Cd/m$^2$). FIG. 9(*b*) represents a crosstalk ratio in the right eye according to horizontal viewing angles, in which the x axis represents a horizontal viewing angle (unit: degree), and the y axis represents a crosstalk ratio (Cd/m$^2$). In each drawing, the dotted line represents results of Comparative Example 1, and the solid line represents results of Example 2.

EXPERIMENTAL EXAMPLE 2

Figure 10:
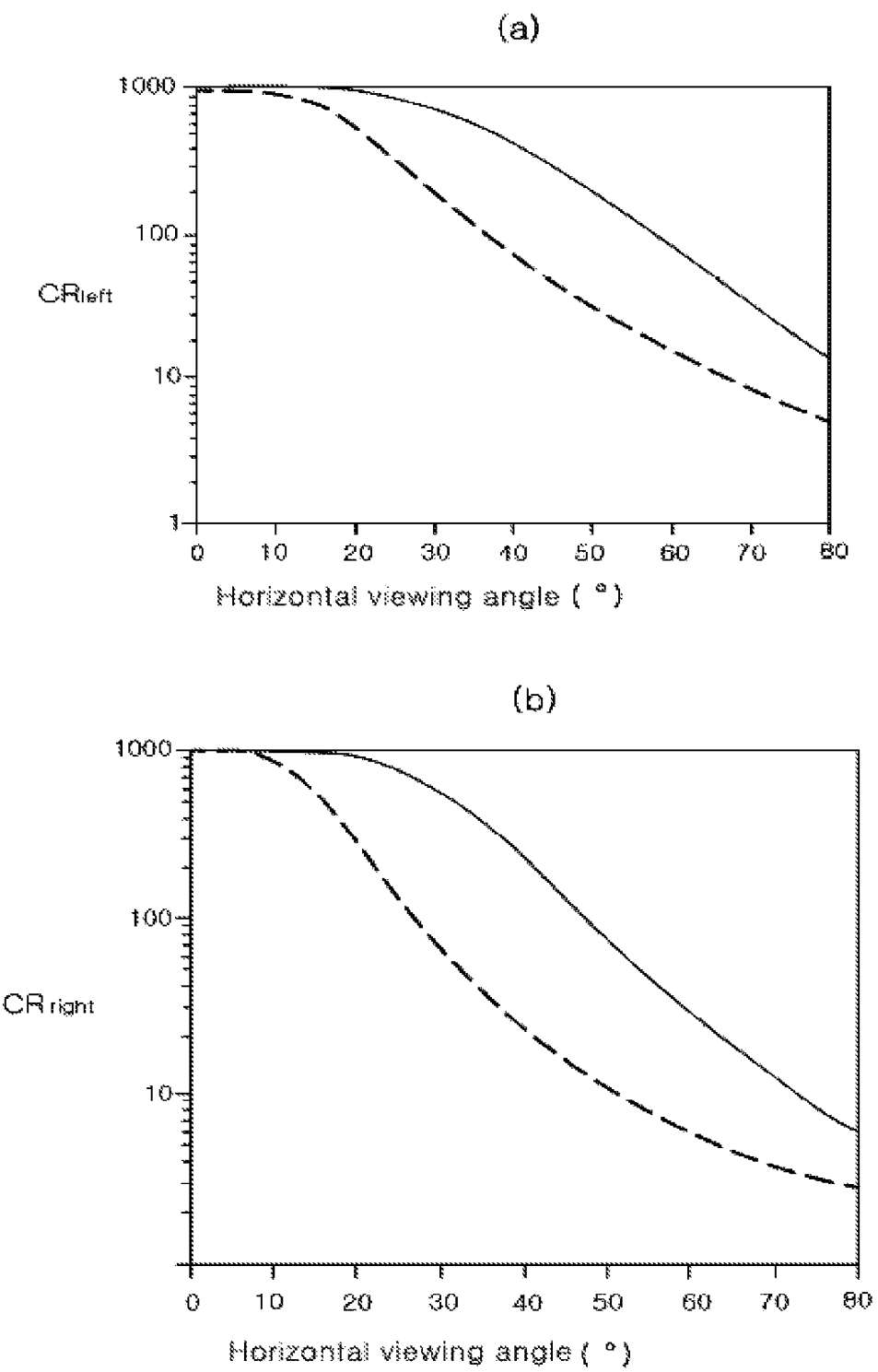

In procedures of using devices in Example 2 and Comparative Example 1, brightness due to crosstalk according to horizontal viewing angles was measured by the method above, and depicted in FIG. 10. In FIG. 10(*a*), the x axis represents a horizontal viewing angle (unit: degree), and the y axis represents brightness ($CR_{left}$). In FIG. 10(*b*), the x axis represents a horizontal viewing angle (unit: degree), and the y axis represents brightness ($CR_{right}$). In each drawing, the dotted line represents results of Comparative Example 1, and the solid line represents results of Example 2.

EXAMPLE 3

Figure 11:
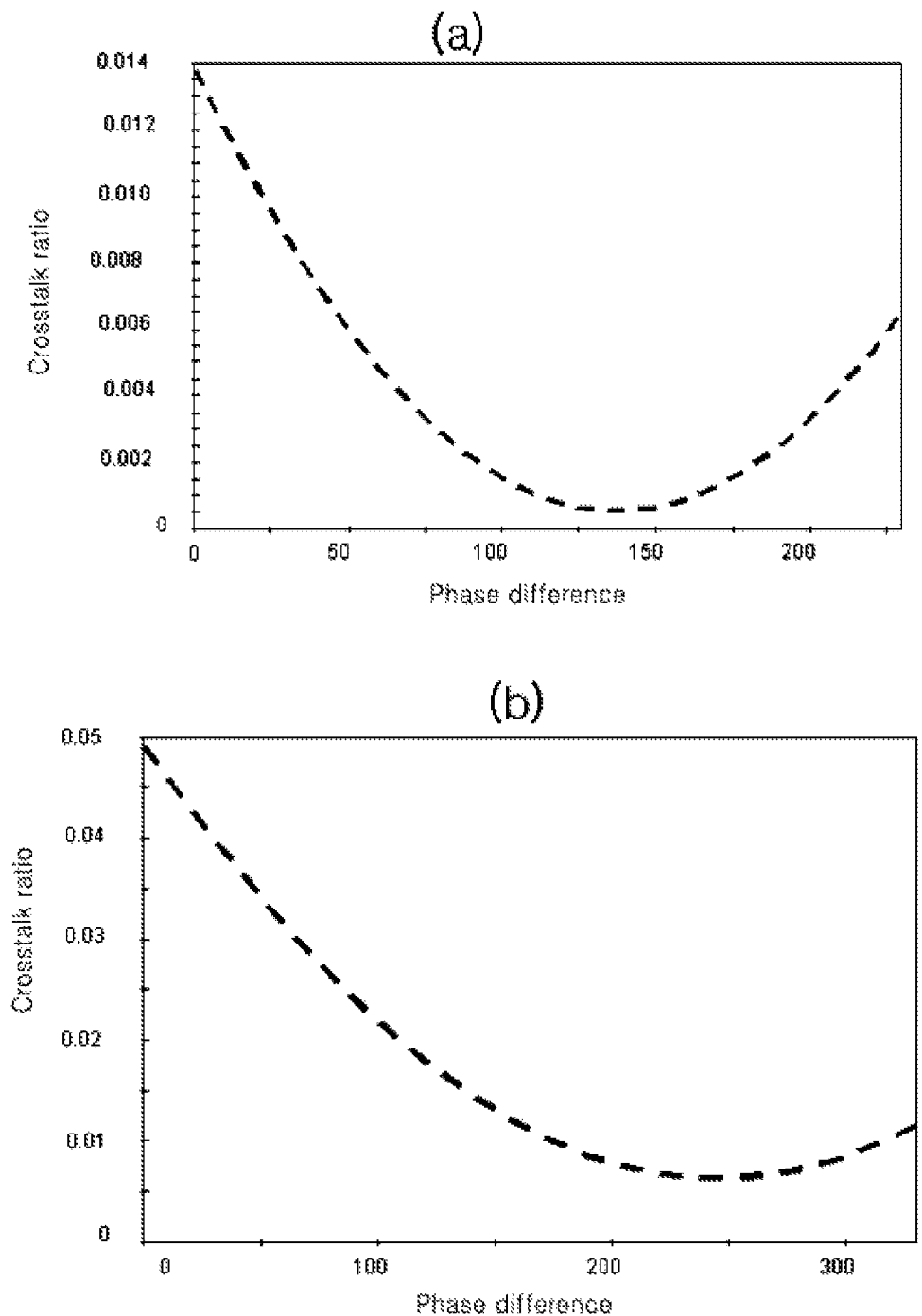

The stereoscopic image display device and the polarizing glasses were prepared by the same method as Example 1, except that the polarizing glasses (linearly-polarized glasses) were prepared, which comprised lenses for the right eye and the left eye, with a polarizing film having a transmission axis formed at 90 degrees with the transmission axis of the polarizing plate (14 in FIG. 1) and a +B plate having a phase difference ($R_{in}$) in the plane direction of 140 nm were sequentially attached on the lens for the right eye; and a polarizing film having a transmission axis formed at 90 degrees with the transmission axis of the polarizing plate (14 in FIG. 1) and a +B plate having a phase difference ($R_{in}$) in the plane direction of 140 nm were sequentially attached on the lens for the left eye; and images emitted from the prepared device was observed. In the above observing procedure, crosstalk ratios observed in the left eye or the right eye were measured by the aforementioned method, by changing phase differences in the thickness direction of the +B plates attached to the lenses for the left eye and the right eye, and the results were depicted in FIG. 11. As the +B plate, a COP (cyclic olefin polymer) retardation film to be usually used as a +B plate was used. FIG. 11(*a*) represents the crosstalk ratio ($Y_L$) in the left eye, wherein the x axis represents a phase difference (unit: nm) in the thickness direction of the +B plate, and the y axis represents the crosstalk ratio (Cd/m$^2$). In addition, FIG. 11(*b*) represents the crosstalk ratio ($Y_R$) in the right eye, wherein the x axis represents a phase difference (unit: nm) in the thickness direction of the +B plate, and the y axis represents the crosstalk ratio (Cd/m$^2$).

EXAMPLE 4

The stereoscopic image display device and the polarizing glasses were prepared by the same method as Example 3, except that considering the results of Example 3, a +B plate (a COP (cyclic olefin polymer) retardation film (thickness: 80 μm)) having a phase difference in the thickness direction of 240 nm and a phase difference in the plane direction of 137.5 nm was attached to the lens for the right eye and a +B plate (a COP (cyclic olefin polymer) retardation film (thickness: 80 μm)) having a phase difference in the thickness direction of 130 nm and a phase difference in the plane direction of 137.5 nm was attached to the lens for the left eye.

COMPARATIVE EXAMPLE 2

The stereoscopic image display device and the polarizing glasses were constituted by the same method as Example 4, except that +B plates were not attached to the lenses for the right eye and the left eye.

EXPERIMENTAL EXAMPLE 3

Figure 12:
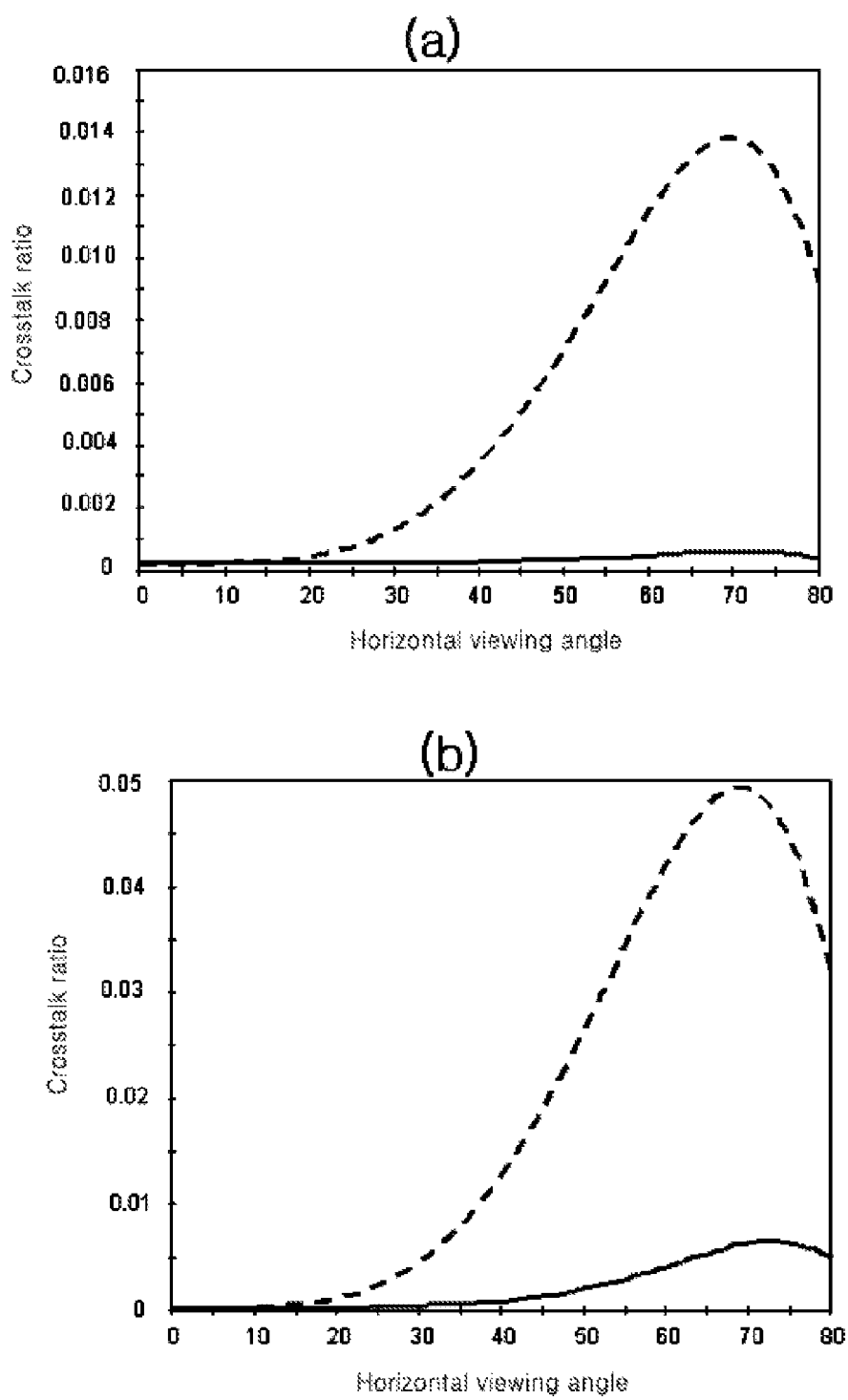

In procedures of using devices in Example 4 and Comparative Example 2, crosstalk ratios of image light for the left eye and image light for the right eye according to horizontal viewing angles were measured by the method above, and depicted in FIG. 12. FIG. 12(*a*) represents the crosstalk ratio ($Y_L$) in the left eye according to horizontal viewing angles, in which the x axis represents a horizontal viewing angle (unit: degree), and the y axis represents the crosstalk ratio (Cd/m$^2$). FIG. 12(*b*) represents the crosstalk ratio ($Y_R$) in the right eye according to horizontal viewing angles, in which the x axis represents a horizontal viewing angle (unit: degree), and the y axis represents the crosstalk ratio ($Cd/m^2$). In each drawing, the dotted line represents results of Comparative Example 2, and the solid line represents results of Example 4.

EXPERIMENTAL EXAMPLE 4

Figure 13:
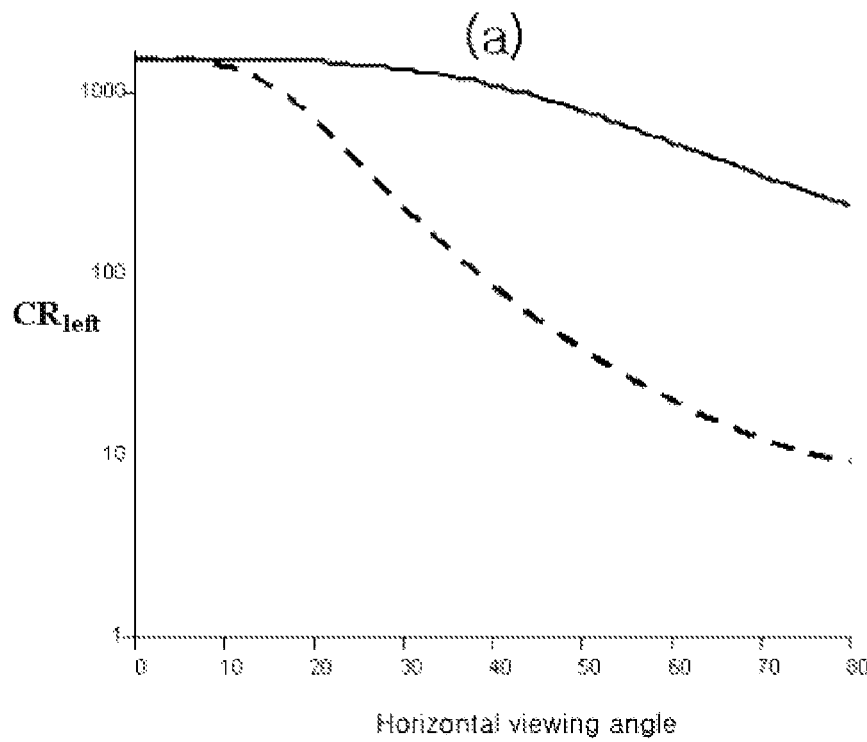
Figure 13:
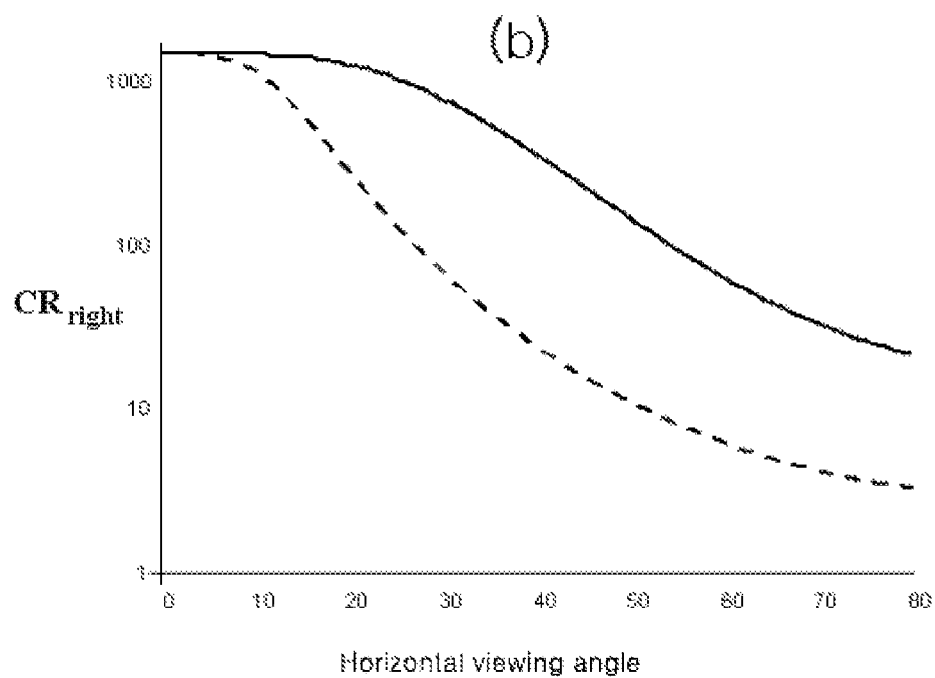

In procedures of using devices in Example 4 and Comparative Example 2, brightness of image light for the left eye and image light for the right eye due to crosstalk according to horizontal viewing angles was measured by the method as above, and depicted in FIG. 13. In FIG. 13(a), the x axis represents a horizontal viewing angle (unit: degree), and the y axis represents brightness ($CR_{left}$). In FIG. 13(b), the x axis represents a horizontal viewing angle (unit: degree), and the y axis represents brightness ($CR_{right}$). In each drawing, the dotted line represents results of Comparative Example 2, and the solid line represents results of Example 4.

EXAMPLE 5

Figure 14:
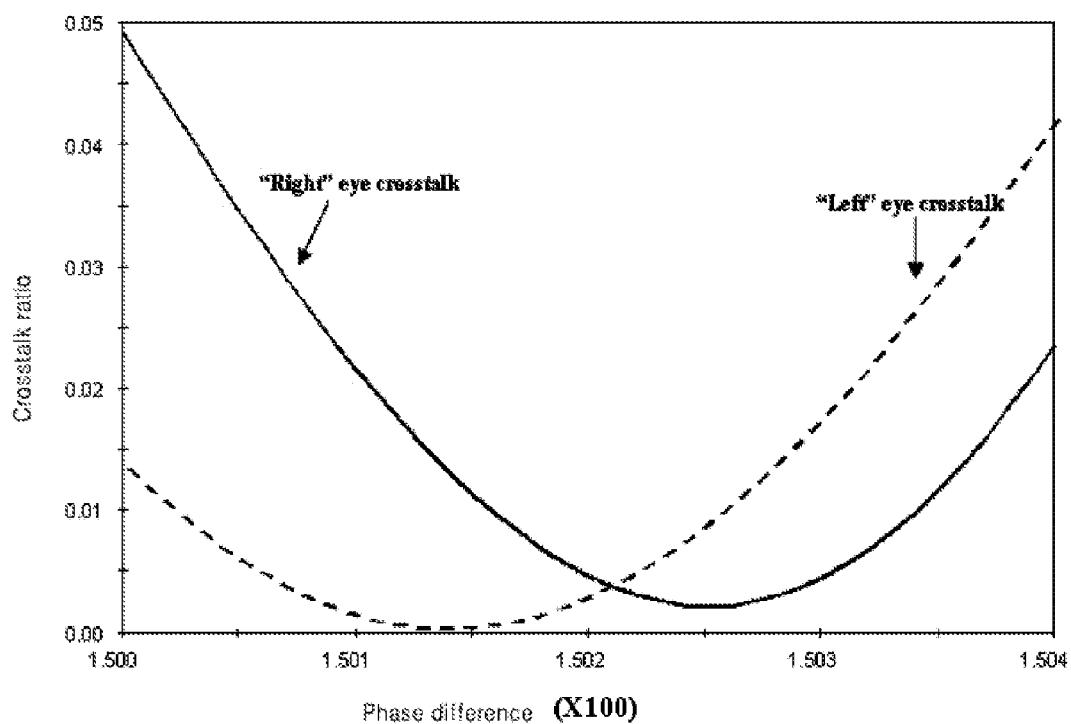

A device that had a structure represented in FIG. 1 including a polarization control layer (15 in FIG. 1) (patterned λ/2 wavelength layer) in which a λ/2 wavelength layer having a slow axis forming −45 degrees with a transmission axis of a polarizing plate (14 in FIG. 1), present only on polarization control regions (L of 15 in FIG. 1) for image light for the left eye, was prepared by attaching a +B plate having a phase difference in the plane direction of 140 nm to the front of the polarization control layer. Then, using polarizing glasses (circularly-polarized glasses) having lenses for the right eye and the left eye, in which a polarizing film having a transmission axis formed at 90 degrees with the transmission axis of the polarizing plate (14 in FIG. 1) and a λ/4 wavelength layer having a slow axis formed at 45 degrees with the transmission axis of the polarizing plate (14 in FIG. 1) were sequentially attached to the lens for the right eye; and a polarizing film having a transmission axis formed at 90 degrees with the transmission axis of the polarizing plate (14 in FIG. 1) and a λ/4 wavelength layer having a slow axis formed at −45 degrees with the transmission axis of the polarizing plate (14 in FIG. 1) were sequentially attached to the lens for the left eye, images emitted from the display device were observed. In the above observing procedure, crosstalk ratios observed in the left eye or the right eye were measured, by changing phase differences in the thickness direction of the +B plates attached to the front of the polarization control layer, and the results were depicted in FIG. 14. Here, as the +B plate, a COP (cyclic olefin polymer) retardation film to be usually used as the +B plate was used. In FIG. 14, the dotted line represents the crosstalk ratio ($Y_L$) ($Cd/m^2$) in the left eye and the solid line represents the crosstalk ratio ($Y_R$) ($Cd/m^2$) in the right eye, wherein the x axis represents a phase difference (unit: 100 nm) in the thickness direction of the +B plate, and the y axis represents the crosstalk ratio ($Cd/m^2$).

EXAMPLE 6

The stereoscopic image display device and the polarizing glasses were prepared by the same method as Example 5, except that considering the results of Example 5, a +B plate (a COP (cyclic olefin polymer) retardation film (thickness: 80 μm)) having a phase difference in the plane direction of 137.5 nm and a phase difference in the thickness direction of 210 nm was attached to the front of the polarization control layer in the device.

COMPARATIVE EXAMPLE 3

The stereoscopic image display device and the polarizing glasses were constituted by the same method as Example 6, except that +B plate was not attached thereto.

EXPERIMENTAL EXAMPLE 5

Figure 15:
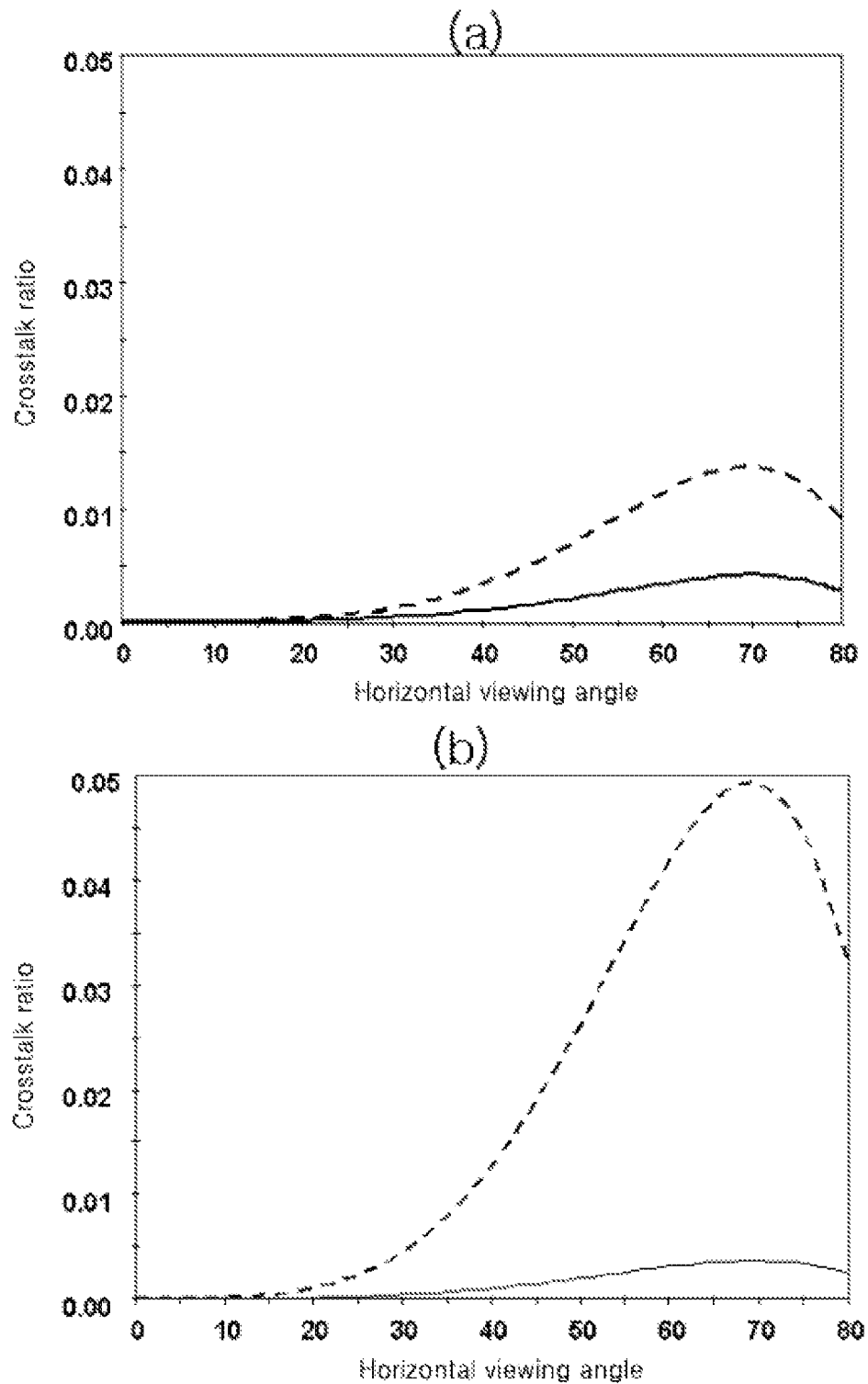

In procedures of using devices in Example 6 and Comparative Example 3, crosstalk ratios of image light for the left eye and image light for the right eye according to horizontal viewing angles were measured by the method above, and depicted in FIG. 15. In FIG. 15(a), the x axis represents a horizontal viewing angle (unit: degree) and the y axis represents the crosstalk ratio ($Y_L$) ($Cd/m^2$) in the left eye. In FIG. 15(b), the x axis represents a horizontal viewing angle (unit: degree) and the y axis represents the crosstalk ratio ($Y_R$) ($Cd/m^2$). In each drawing, the dotted line represents results of Comparative Example 3, and the solid line represents results of Example 6.

EXPERIMENTAL EXAMPLE 6

Figure 16:
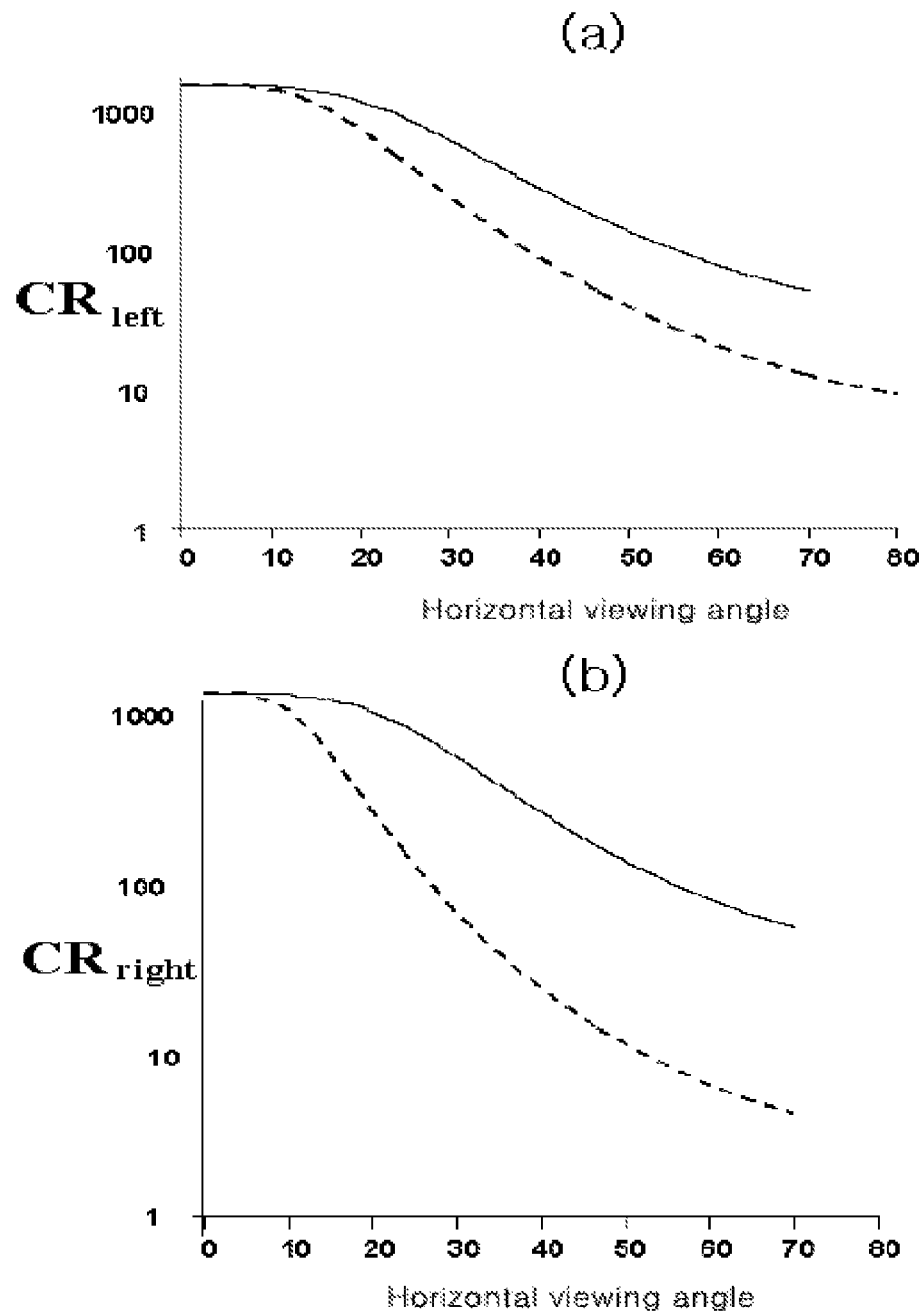

In procedures of using devices in Example 6 and Comparative Example 3, brightness of image light for the left eye and image light for the right eye by crosstalk according to horizontal viewing angles was measured by the method above, and depicted in FIG. 16. In FIG. 16(a), the x axis represents a horizontal viewing angle (unit: degree), and the y axis represents brightness ($CR_{left}$). In FIG. 16(b), the x axis represents a horizontal viewing angle (unit: degree), and the y axis represents brightness ($CR_{right}$). In each drawing, the dotted line represents results of Comparative Example 3, and the solid line represents results of Example 6.

[Description of References]

1: Stereoscopic image display device
11: Light source
12, 14: Polarizing plate
13: Image generation layer
15: Polarization control layer
16: Retardation film
UR: Generation region of image light for the right eye
UL: Generation region of image light for the left eye
AR: Polarization control region for image light for the right eye
AL: Polarization control region for image light for the left eye
6: Optical filter
LE: Left eye
RE: Right eye
71L, 71R: Polarizing plate
72L, 72R: Retardation film
73L, 73R: λ/4 wavelength layer

The invention claimed is:
1. A stereoscopic image display device, comprising:
an image display part which is capable of generating image signals comprising image lights for the right eye and for the left eye, and is then capable of transferring them to the observer's side; and
a +B plate is arranged such that the image signals from the image display part may pass through the +B plate according to its thickness direction and then be transferred to the observer's side, and that satisfies any one relationship of Formulas 8 to 11:

$$(9.24\times10^{-7})X^2 - 0.000236X + 0.0288 \leq 0.5 \qquad \text{[Formula 8]}$$

$$(5.5\times10^{-7})X^2-0.000347X+0.067\leq0.5 \quad \text{[Formula 9]}$$

$$(1.97\times10^{-6})X^2-0.000616X+0.0644\leq0.5 \quad \text{[Formula 10]}$$

$$(1.99\times10^{-6})X^2-0.00125X+0.206\leq0.5 \quad \text{[Formula 11]}$$

wherein, X is the phase difference in the thickness direction of the +B plate.

2. The stereoscopic image display device according to claim 1, wherein the phase difference in the thickness direction of the region in the +B plate, through which the image light for the right eye passes, satisfies Formula 8 and the phase difference in the thickness direction of the region in the +B plate, through which the image light for the left eye passes, satisfies Formula 9; or the phase difference in the thickness direction of the region in the +B plate, through which the image light for the right eye passes, satisfies Formula 10 and the phase difference in the thickness direction of the region in the +B plate, through which the image light for the left eye passes, satisfies the Formula 11.

3. A stereoscopic image display device, comprising:
an image display part comprising an image generation part which is capable of generating image signals comprising image lights for the right eye and for the left eye, and is then capable of transferring them to the observer's side; and a polarization control layer which is on the observer's side from the image generation part, and which, if the image signals are entered therein, is capable of controlling them such that the image light for the right eye and the image light for the left eye have polarization states different from each other, and is then capable of transferring them to the observer's side, the polarization control layer comprising a polarization control region for the image light for the right eye and a polarization control region for the image light for the left eye, and also comprising λ/4 wavelength layers on the polarization control regions for the image lights for the right eye and for the left eye and a λ/2 wavelength layer only on any one region of the polarization control regions for the image lights for the right eye and for the left eye, and
a +C plate which is arranged such that the image signals from the image display part may pass through the +C plate according to its thickness direction and then be transferred to the observer's side, and of which the phase difference in the thickness direction is 50 nm to 270 nm.

4. The stereoscopic image display device according to claim 3, wherein the phase differences in the thickness direction of the regions of the +C plate, through which the image light for the right eye passes, is from 140 nm to 200 nm, and the phase difference in the thickness direction of the region of the +C plate, through which the image light for the left eye passes, is from 60 nm to 120 nm.

5. A stereoscopic image display device, comprising:
an image display part comprising an image generation part which is capable of generating image signals comprising image lights for the right eye and for the left eye, and is then capable of transferring them to the observer's side; and a polarization control layer which is on the observer's side from the image generation part, and which, if the image signals are entered therein, is capable of controlling them such that the image light for the right eye and the image light for the left eye have polarization states different from each other, and is then capable of transferring them to the observer's side, the polarization control layer comprising a polarization control region for the image light for the right eye and a polarization control region for the image light for the left eye, and also comprising λ/4 wavelength layers on the polarization control regions for the image lights for the right eye and for the left eye, the λ/4 wavelength layers on the polarization control regions for the image lights for the right eye and for the left eye have optical axes, of which directions are different from each other; and
a +C plate, of which the phase difference in the thickness direction is from 30 nm to 350 nm, and which is arranged such that the image signals from the image display part may pass through the +C plate according to its thickness direction and then be transferred to the observer's side.

6. The stereoscopic image display device according to claim 5, wherein the phase differences in the thickness direction of the region of the +C plate, through which the image light for the right eye passes, is from 150 nm to 350 nm, and the phase difference in the thickness direction of the region of the +C plate, through which the image light for the left eye passes, is from 50 nm to 250 nm.

7. The stereoscopic image display device according to claim 5, wherein the phase differences in the thickness direction of the region of the +C plate, through which the image light for the right eye passes, is from 200 nm to 300 nm, and the phase difference in the thickness direction of the region of the +C plate, through which the image light for the left eye passes, is from 100 nm to 150 nm.

8. The stereoscopic image display device according to claim 1, wherein the image display part comprises:
an image generation part which is capable of generating image signals comprising image lights for the right eye and for the left eye, and is then capable of transferring them to the observer's side; and
a polarization control layer which is on the observer's side from the image generation part, and which, if the image signals are entered therein, is capable of controlling them such that the image light for the right eye and the image light for the left eye have polarization states different from each other, and is then capable of transferring them to the observer's side.

9. The stereoscopic image display device according to claim 8, wherein the polarization control layer comprises a polarization control region for the image light for the right eye and a polarization control region for the image light for the left eye, and comprises λ/4 wavelength layers on the polarization control regions for the image lights for the right eye and for the left eye and a λ/2 wavelength layer only on any one region of the polarization control regions for the image lights for the right eye and for the left eye.

10. The stereoscopic image display device according to claim 9, wherein the phase differences in the thickness direction of the +B plate is from 50 nm to 350 nm.

11. The stereoscopic image display device according to claim 8, wherein the polarization control layer comprises a polarization control region for the image light for the right eye and a polarization control region for the image light for the left eye, and comprises a λ/2 wavelength layer only on any one region of the polarization control regions for the image lights for the right eye and for the left eye.

12. The stereoscopic image display device according to claim 11, wherein the phase difference in the thickness direction of the +B plate is from 50 nm to 350 nm.

13. An optical filter for a stereoscopic image display device comprising:
a polarization control layer which, if the image signals comprising image lights for the right eye and for the left eye are entered therein, is capable of controlling them such that the image light for the right eye and the image light for the left eye have polarization states different from each other, and is then capable of emitting them; and a +B plate which is attached to the side of the polarization control layer, from which the image signals are emitted, and which satisfies any one relationship of Formulas 8 to 11:

$$(9.24\times10^{-7})X^2-0.000236X+0.0288\leq0.5 \quad \text{[Formula 8]}$$

$$(5.5\times10^{-7})X^2-0.000347X+0.067\leq0.5 \quad \text{[Formula 9]}$$

$$(1.97\times10^{-6})X^2-0.000616X+0.0644\leq0.5 \quad \text{[Formula 10]}$$

$$(1.99\times10^{-6})X^2-0.00125X+0.206\leq0.5 \quad \text{[Formula 11]}$$

wherein, X is the phase difference in the thickness direction of the +B plate.

14. An optical filter for a stereoscopic image display device comprising:

a polarization control layer which, if the image signals comprising image lights for the right eye and for the left eye are entered therein, is capable of controlling them such that the image light for the right eye and the image light for the left eye have polarization states different from each other, and is then capable of emitting them, and which comprises a polarization control region for the image light for the right eye and a polarization control region for the image light for the left eye, and also comprises λ/4 wavelength layers on the polarization control regions for the image lights for the right eye and for the left eye and a λ/2 wavelength layer only on any one region of the polarization control regions for the image lights for the right eye and for the left eye, and a +C plate which is attached to the side of the polarization control layer, from which the image signals are emitted, and of which the phase difference in the thickness direction is 50 nm to 270 nm.

15. An optical filter for a stereoscopic image display device comprising:

a polarization control layer which, if the image signals comprising image lights for the right eye and for the left eye are entered therein, is capable of controlling them such that the image light for the right eye and the image light for the left eye have polarization states different from each other, and is then capable of emitting them, and which comprises a polarization control region for the image light for the right eye and a polarization control region for the image light for the left eye, and also comprises λ/4 wavelength layers on the polarization control regions for the image lights for the right eye and for the left eye, the λ/4 wavelength layers on the polarization control regions for the image lights for the right eye and for the left eye have optical axes, of which directions are different from each other, and a +C plate which is attached to the side of the polarization control layer, from which the image signals are emitted, and of which the phase difference in the thickness direction is 30 nm to 350 nm.

16. Polarizing glasses that are used for observing a stereoscopic image comprising a lens for the right eye and a lens for the left eye, wherein the lenses for the right eye and the lenses for the left eye each comprise a +B plate satisfying any one relationship of Formulas 8 to 11; and a polarizing plate:

$$(9.24\times10^{-7})X^2-0.000236X+0.0288\leq0.5 \quad \text{[Formula 8]}$$

$$(5.5\times10^{-7})X^2-0.000347X+0.067\leq0.5 \quad \text{[Formula 9]}$$

$$(1.97\times10^{-6})X^2-0.000616X+0.0644\leq0.5 \quad \text{[Formula 10]}$$

$$(1.99\times10^{-6})X^2-0.00125X+0.206\leq0.5 \quad \text{[Formula 11]}$$

wherein, X is the phase difference in the thickness direction of the +B plate.

17. Polarizing glasses that are used for observing a stereoscopic image comprising a lens for the right eye and a lens for the left eye, wherein the lenses for the right eye and the lenses for the left eye each comprise a +C plate having the phase difference in the thickness direction, a λ/4 wavelength layer and a polarizing plate.

18. The polarizing glasses according to claim 17, wherein the phase difference in the thickness direction of the +C plate is from 50 nm to 270 nm.

19. The polarizing glasses according to claim 18, wherein the phase difference in the thickness direction of the +C plate in the lens for the right eye is from 140 nm to 200 nm and the phase difference in the thickness direction of the +C plate in the lens for the left eye is from 60 nm to 120 nm.

20. The polarizing glasses according to claim 17, wherein the phase difference in the thickness direction of the +C plate is from 30 nm to 350 nm.

21. The polarizing glasses according to claim 20, wherein the phase difference in the thickness direction of the +C plate in the lens for the right eye is from 150 nm to 350 nm and the phase difference in the thickness direction of the +C plate in the lens for the left eye is from 50 nm to 250 nm.

22. The polarizing glasses according to claim 20, wherein the phase difference in the thickness direction of the +C plate in the lens for the right eye is from 200 nm to 300 nm and the phase difference in the thickness direction of the +C plate in the lens for the left eye is from 100 nm to 150 nm.

23. The polarizing glasses according to claim 17, wherein the absorption axes of the polarizing plates in the lenses for the right eye and in the lenses for the left eye are horizontal to each other, and the λ/4 wavelength layers in the lenses for the right eye and in the lenses for the left eye have optical axes, of which directions are different from each other, or the absorption axes of the polarizing plates in the lenses for the right eye and in the lenses for the left eye have directions different from each other and the λ/4 wavelength layers in the lenses for the right eye and in the lenses for the left eye have optical axes parallel to each other.

* * * * *